United States Patent
Kuo et al.

(10) Patent No.: US 10,027,883 B1
(45) Date of Patent: Jul. 17, 2018

(54) PRIMARY USER SELECTION FOR HEAD TRACKING

(71) Applicant: Amazon Technologies, Inc., Reno, NV (US)

(72) Inventors: Cheng-Hao Kuo, Seattle, WA (US); Jim Oommen Thomas, Seattle, WA (US); Tianyang Ma, San Jose, CA (US); Stephen Vincent Mangiat, San Francisco, CA (US); Sisil Sanjeev Mehta, San Jose, CA (US); Ambrish Tyagi, Palo Alto, CA (US); Amit Kumar Agrawal, Santa Clara, CA (US); Kah Kuen Fu, Sunnyvale, CA (US); Sharadh Ramaswamy, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 646 days.

(21) Appl. No.: 14/307,491

(22) Filed: Jun. 18, 2014

(51) Int. Cl.
    *G06K 9/00* (2006.01)
    *G06K 9/46* (2006.01)
    *G06K 9/66* (2006.01)
    *H04N 5/225* (2006.01)
    *H04N 5/232* (2006.01)

(52) U.S. Cl.
    CPC ..... *H04N 5/23219* (2013.01); *H04N 5/23293* (2013.01)

(58) Field of Classification Search
    CPC ................ H04N 5/23293; H04N 5/23219
    See application file for complete search history.

(56) References Cited

U.S. PATENT DOCUMENTS

| 6,301,370 | B1 | 10/2001 | Steffens et al. | |
|---|---|---|---|---|
| 8,106,995 | B2 * | 1/2012 | Tamaru | G02B 7/38 348/345 |
| 2007/0064145 | A1 * | 3/2007 | Sugimoto | G03B 13/36 348/345 |
| 2008/0025710 | A1 * | 1/2008 | Sugimoto | G03B 17/00 396/48 |

(Continued)

FOREIGN PATENT DOCUMENTS

WO    WO 2010/144050    12/2010

OTHER PUBLICATIONS

Guo, Pengyu, et al., "A Real-Time Optical Tracking and Measurement Processing System for Flying Targets," The Scientific World Journal, Apr. 2014, 11 pages.

(Continued)

*Primary Examiner* — Rebecca Volentine
(74) *Attorney, Agent, or Firm* — Polsinelli LLP

(57) ABSTRACT

Various embodiments enable a primary user to be identified and tracked using stereo association and multiple tracking algorithms. For example, a face detection algorithm can be run on each image captured by a respective camera independently. Stereo association can be performed to match faces between cameras. If the faces are matched and a primary user is determined, a face pair is created and used as the first data point in memory for initializing object tracking. Further, features of a user's face can be extracted and the change in position of these features between images can determine what tracking method will be used for that particular frame.

18 Claims, 18 Drawing Sheets

(56) References Cited

U.S. PATENT DOCUMENTS

| | | | |
|---|---|---|---|
| 2008/0199056 A1* | 8/2008 | Tokuse | G06K 9/00295 |
| | | | 382/118 |
| 2008/0317285 A1* | 12/2008 | Abe | H04N 5/23216 |
| | | | 382/103 |
| 2009/0115864 A1* | 5/2009 | Ogawa | G06K 9/00248 |
| | | | 348/222.1 |
| 2009/0142003 A1* | 6/2009 | Fukuda | H04N 1/3875 |
| | | | 382/286 |
| 2009/0185056 A1* | 7/2009 | Okamoto | G06K 9/00228 |
| | | | 348/240.99 |
| 2010/0007763 A1* | 1/2010 | Yokohata | H04N 5/23212 |
| | | | 348/222.1 |
| 2010/0238272 A1 | 9/2010 | Cameron et al. | |
| 2010/0303294 A1* | 12/2010 | Zschau | A61B 3/113 |
| | | | 382/103 |
| 2011/0241991 A1* | 10/2011 | Ogura | G06K 9/00248 |
| | | | 345/158 |
| 2011/0254930 A1 | 10/2011 | Sugimoto | |
| 2012/0008856 A1* | 1/2012 | Hewes | H04N 13/0022 |
| | | | 382/154 |
| 2012/0069143 A1 | 3/2012 | Chu | |
| 2012/0070041 A1 | 3/2012 | Wang | |
| 2012/0092516 A1* | 4/2012 | Hata | G03B 15/00 |
| | | | 348/222.1 |
| 2012/0140043 A1* | 6/2012 | Mori | H04N 5/23216 |
| | | | 348/47 |
| 2012/0293667 A1 | 11/2012 | Baba et al. | |
| 2013/0002814 A1 | 1/2013 | Park et al. | |
| 2013/0076868 A1 | 3/2013 | Fujii | |
| 2013/0083174 A1* | 4/2013 | Sakurabu | H04N 13/0022 |
| | | | 348/51 |
| 2013/0107018 A1* | 5/2013 | Sakurabu | H04N 5/23219 |
| | | | 348/49 |
| 2013/0201283 A1 | 8/2013 | Broberg et al. | |
| 2013/0202161 A1* | 8/2013 | Shor | G06K 9/00201 |
| | | | 382/118 |
| 2015/0344032 A1 | 12/2015 | Oh et al. | |
| 2016/0188963 A1* | 6/2016 | Kim | G06K 9/00228 |
| | | | 382/118 |

OTHER PUBLICATIONS

Redert, Andre, et al., "Correspondence Estimation in Image Pairs, Designing Estimators for Dense Geometric Correspondence Fields" in Signal Processing Magazine, IEEE, May 1999, pp. 29-46.

Yang, W., et al., "Joint Motion and Disparity Fields Estimation for Stereoscopic Video Sequences," Signal Processing: Image Communication, vol. 20, Issue 3, Mar. 2005, pp. 265-276.

\* cited by examiner

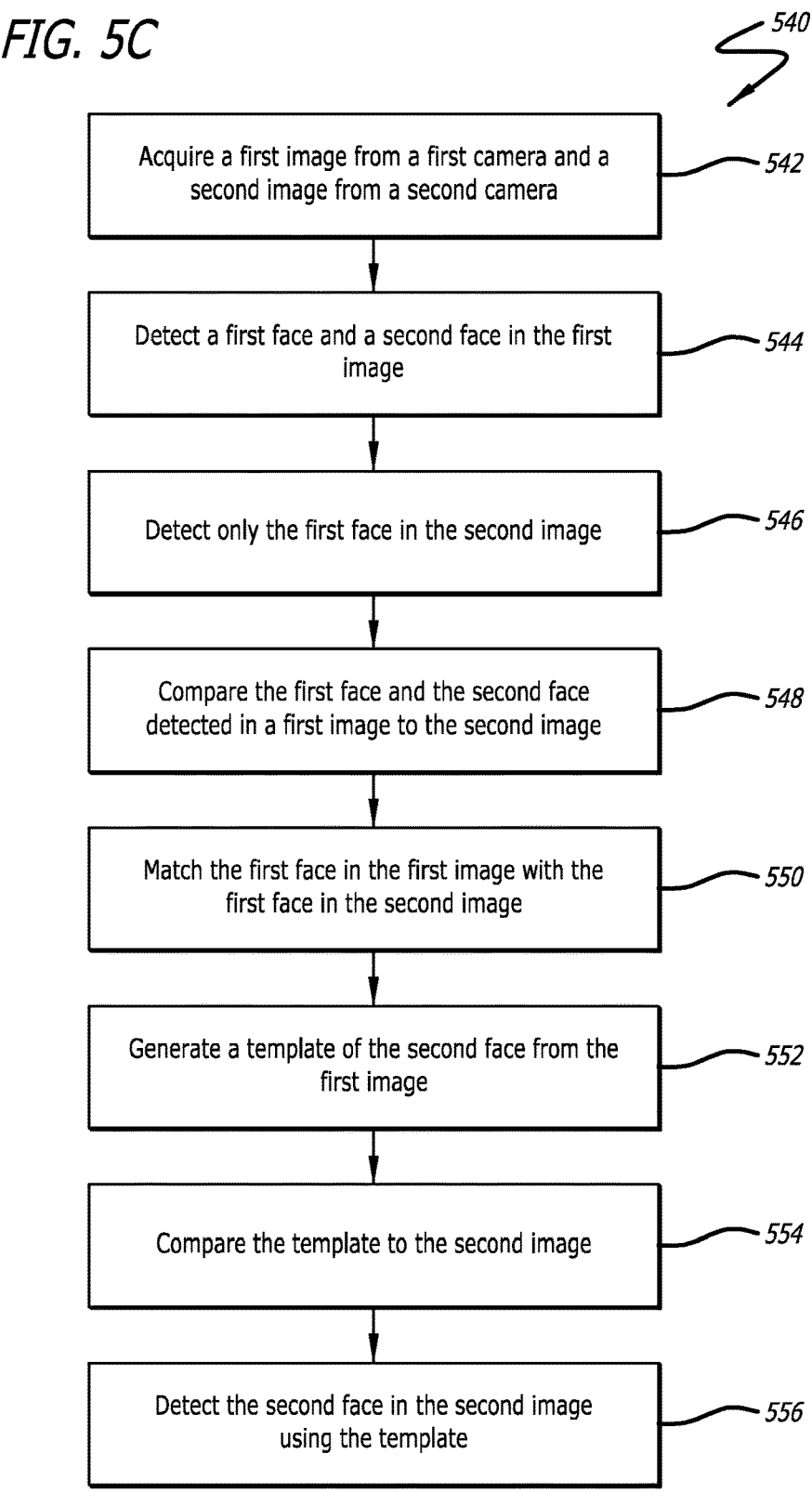

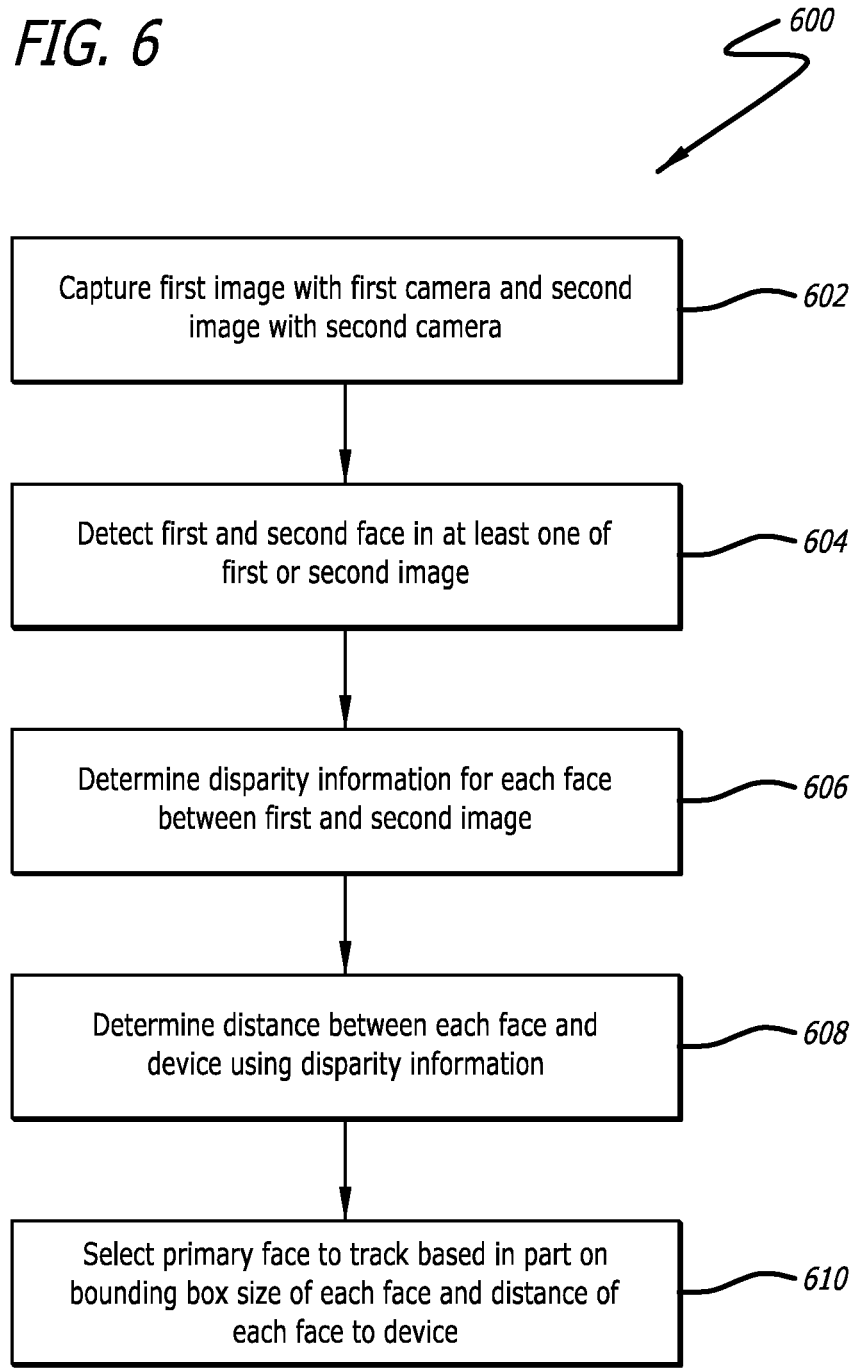

PRIMARY USER SELECTION FOR HEAD TRACKING

BACKGROUND

People are increasingly interacting with computers and other electronic devices in new and interesting ways. For example, object tracking can be implemented for recognizing certain user gestures, such as head nods or shakes, eye winks or other ocular motion, or hand and/or finger gestures, as input for the device. Object tracking can also be utilized for advanced device security features such as ensuring "live" facial recognition, fingerprinting, retinal scanning, or identification based on gait. Devices capable of object tracking can also be configured for video editing techniques such as video stabilization (e.g., to remove jitter) or to render smooth camera motions due to panning, tilting, or dollying in/dollying out. There are, however, many challenges to properly tracking an object due to, for example, abrupt motions, changes in appearance or background, device motion, among others. Further, factors such as image sensor and lens characteristics, illumination conditions, noise, and occlusion can also affect how an object is represented from image to image or frame to frame. Additionally, the processing requirements for adequate object tracking can often be at odds with the objective of minimizing processing and power use on portable computing devices.

BRIEF DESCRIPTION OF THE DRAWINGS

Various embodiments in accordance with the present disclosure will be described with reference to the drawings, in which:

FIG. 5C illustrates an example process for recovering an undetected face in an image in accordance with various embodiments;

FIG. 6 illustrates an example process for determining a primary user in accordance with various embodiments;

DETAILED DESCRIPTION

Figure 1A:
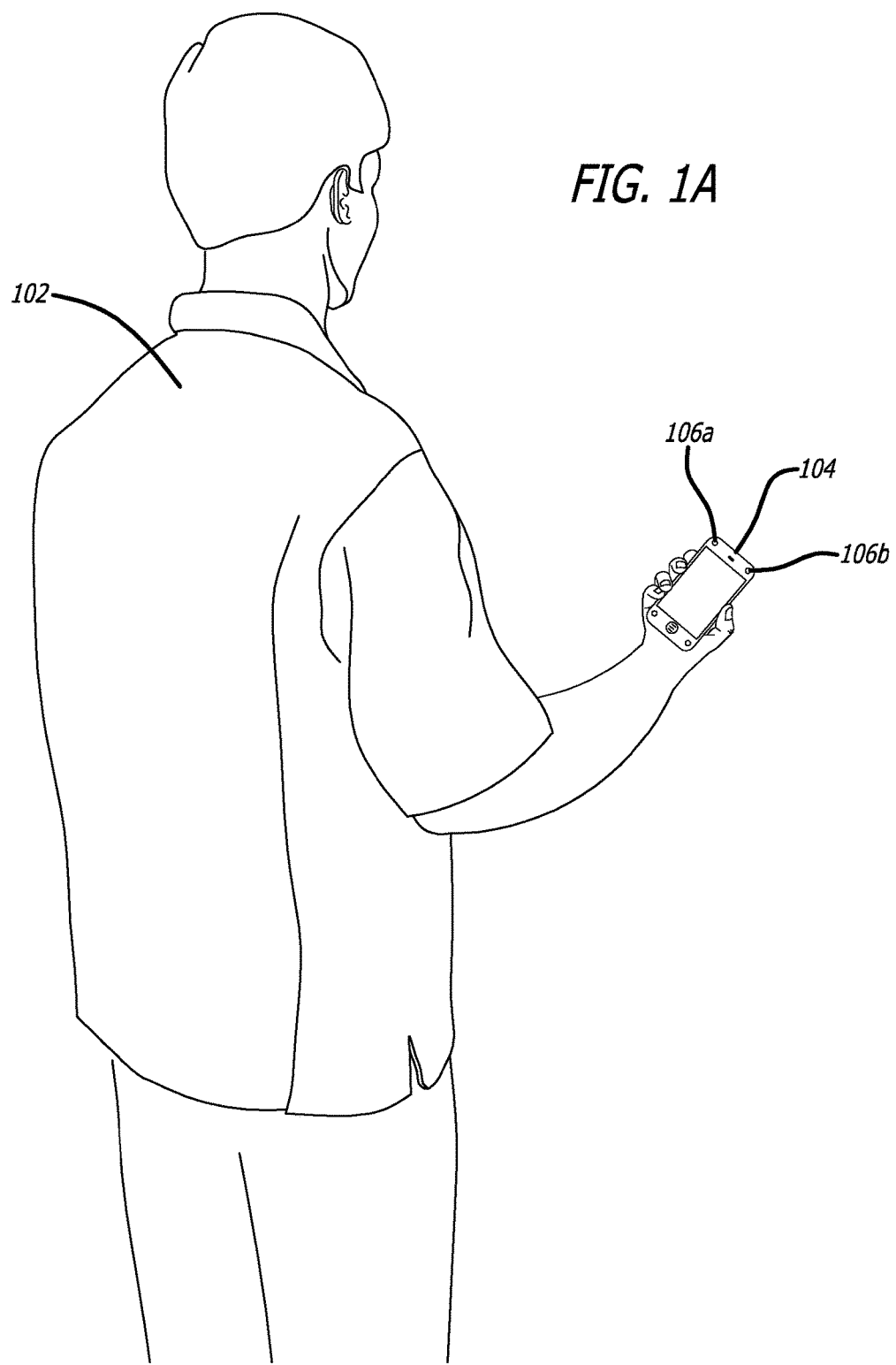
FIG. 1A illustrates an example of a user holding computing device with multiple cameras in accordance with at least one embodiment.

Systems and methods in accordance with various embodiments of the present disclosure may overcome one or more of the aforementioned and other deficiencies experienced in conventional approaches for detecting and/or tracking an object, such as a user. In particular, various approaches enable a primary user to be identified and tracked using stereo association and multiple tracking algorithms. For example, a face detection algorithm can independently analyze two or more images captured by two or more cameras having overlapping fields of view to attempt to detect the presence of a user. Upon detecting a first representation of a face in a first image captured by a first camera, the first representation of the face is matched to a second representation of the face captured in a second image by a second camera. In one example, the face is matched between images by calculating a first intensity histogram of the first representation and a second intensity histogram for the second representation and comparing the first and second intensity histograms. Similarly, if a second face is also detected, a first representation of the second face in the first image will be matched to a second representation of the second face the second image. Further, if there is a third camera, these faces will be matched to their corresponding face captured by the third camera. If the first representation of the face matches the second representation of the face, a face pair (i.e., a designation for a face detected in a first image from a first camera and detected in a second image from a second camera, where the first image and the second image were captured at the same time t.) is created and used as the first data point in memory for initializing object tracking. If, however, the face was only detected in, for example, the first image and not the second image, a matching algorithm can analyze the second image using a template of the first representation of the face from the first image in an attempt to recover the missing face in the second image. Once the missing face is recovered and the faces are matched, object tracking can be initiated. Additionally, if more than one face is detected in the images, a primary face or user to track is determined using depth or disparity information, position of each face relative to a center of a respective image, face size, and the like, as will be explained in more detail below. Accordingly, once the face pair is identified, object tracking can begin and the face pair is stored in memory.

Once a face pair is created, a subsequent image captured by each camera is analyzed to detect the primary face (e.g., tracking-by-detection). Some tracking algorithms are designed to track a face only when it is detected in a previous image. Placing such a limitation, however, could render such a method inoperable when a face is not recognized in, for example, a second image by the face detection algorithm, but is detected in the first and third image in a respective sequence. In such an instance, a second tracking algorithm, such as a Median Flow Tracker (MFT), can be used when a face is detected in a previous image captured by each camera, but is not detected in any of the current images from the cameras. Thus, in this example, the MFT algorithm detects the face in at least one of the current images and, then, in a subsequent frame, the process of attempting to detect the face using the face detection algorithm resumes. Therefore, if the face pair is detected in a previous frame, tracking-by-detection is performed. If the face pair is not detected in the previous frame, the MFT algorithm is used.

The face detection algorithm returns information corresponding to a location of the face in the form of a bounding box (e.g., a set of points in image space within which the face is bound). Facial features within each bounding box are then extracted for to determine, for example, the location of a user's eyes or mouth. Accordingly, the change in location of the user's eyes between subsequent images is calculated and the amount of this change is used to determine an output for the current location of the user's eye that is smoother and reduces jitteriness relative to simply providing the current location of the user's eyes. In one example, if this change is less than a first amount or threshold, then the position of the user has only slightly changed relative to their position in the previous frame. Since this change is small, the current position of the user's eyes can be reasonable estimated as their location in the previous frame, as if the user hasn't moved. In another example, if this change is between the first threshold and a second threshold, a single point tracking algorithm can be used to track the user's eyes between these two frames in order to reduce jitteriness. If, however, this change in optical flow is greater than the second threshold, the current position of the user's eyes can be used. In this instance, the tracking output will appear quite jittery, however, since the change in eye position is so great (i.e., greater than the second threshold) the user has moved quickly or abruptly and, thus, an abrupt change, in this instance, would not only be acceptable, it would likely be expected. Once the current location of the eyes, in this example, is determined for each image captured by each camera, stereo disparity between this current location between these images is determined. The stereo disparity is then used to determine a z-depth for the eyes, by calculating a distance between the eyes and the computing device, in order to determine a three-dimensional position (x, y, z) of the eyes relative to the computing device.

Various other functions and advantages are described and suggested below as may be provided in accordance with the various embodiments.

FIG. 1A illustrates an example wherein user 102 is holding computing device 104 that can be used in accordance with various embodiments. Although a mobile computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, computing device 104 has a first or left camera 106a and a second or right camera 106b (e.g., stereoscopic cameras) capable of capturing images simultaneously or substantially simultaneously to, therefore, provide stereoscopic image information, as will be explained in greater detail below. Each camera can, for example, be capable of capturing image information over a visible and/or infrared (IR) spectrum, and in at least some embodiments can select between visible and IR operational modes. For example, each camera 106a, 106b, etc. can comprise a digital camera incorporating a CMOS image sensor. For example, the CMOS image sensor may be an 8-bit greyscale image sensor that captures a 400 pixel×400 pixel image in at least one embodiment. In some embodiments, the imaging element can incorporate other image sensors (such as a charged couple device (CCD)) and/or can include multiple cameras, including at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

Figure 1B:
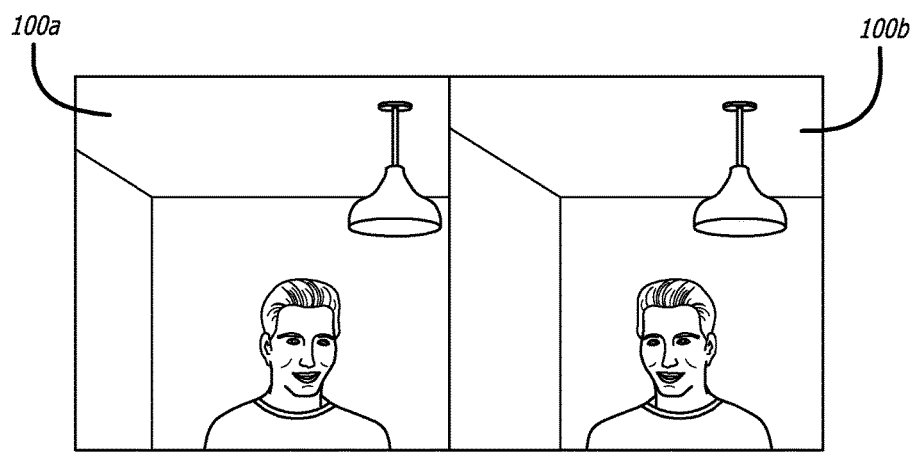
FIG. 1B illustrates an example set of images of a user captured by a first camera and a second camera of a computing device in accordance with at least one embodiment.

Accordingly, FIG. 1B illustrates a pair of stereo images including image 100a captured by left camera 106a substantially simultaneously as image 100b is captured by right camera 106b in accordance with various embodiments. As discussed above, there are many challenges facing object tracking and each tracking algorithm has its strengths and weaknesses. For example, some tracking algorithms can adequately predict a current location of an object based on past movement of the object in previous frames even when the object is not detected by a detection algorithm in a current frame. The estimation involved in making this prediction, however, can result in unwanted tracking drift. Other tracking algorithms can potentially provide a more accurate determination of an object's current location; however, the output can be unstable, thereby, resulting in tracking jitters. Accordingly, a method for adequately tracking an object without the shortcoming of existing methods is, therefore, desirable.

Figure 2:
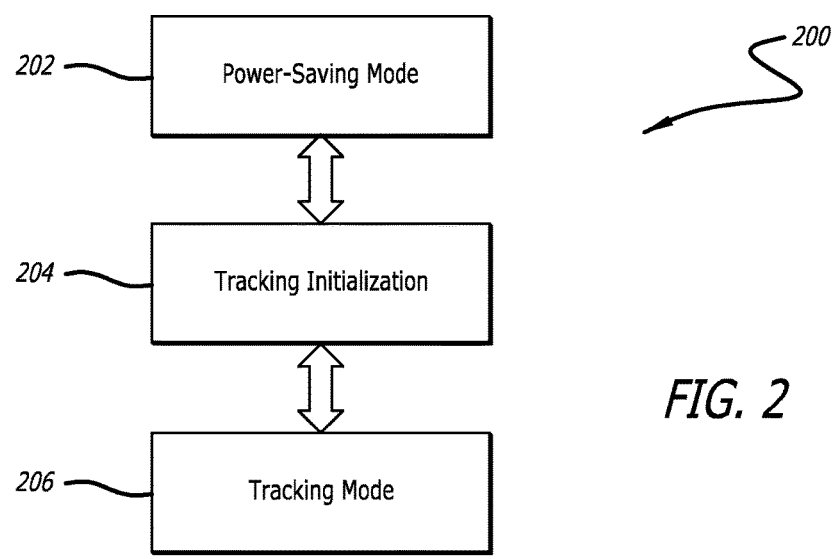
FIG. 2 illustrates an example process corresponding to the various modes associated with object detection and tracking in accordance with various embodiments.

Accordingly, FIG. 2 illustrates an example process 200 illustrating different modes associated with an object tracking algorithm in accordance with various embodiments. In this example, computing device 104 is in power-saving mode 202 where computing device 104 is essentially scanning for a user to track. In the power saving mode, therefore, computing device 104 may periodically attempt to detect a user by, for example, determining optimal camera settings and IR LED illumination for various lighting conditions. These settings can include, for example, camera selection, camera exposure duration, camera gain, IR LED duration, IR LED current, among others. If no face is detected in a respective scene, computing device 104 may vary each of these in an attempt to recognize a user over a range of lighting conditions and variety of circumstances.

In at least one embodiment, if a user is detected in power-saving mode 202, computing device 104 enters tracking initialization mode 204. In this mode, the user's face is first matched in a first image from each camera (106a, 106b) and a primary user is selected to track if more than one face is detected. Accordingly, in this example, a face detection algorithm independently analyzes images from left camera 106a and right camera 106b to match representations of a face between cameras. If the representations all match, a face pair is created and used as the first data point in memory for initializing object tracking 206. If, however, a face was only detected in only one frame from cameras (106a, 106b), the missing face is recovered using techniques discussed in more detail below. Once the missing face is recovered and all faces matched, object tracking 206 is initiated. Additionally, in tracking initialization mode 204, if more than one face is detected, a primary face or user to track is be determined using depth or disparity information, closest face to a center of the overlapping fields of view of cameras (106a, 106b), face size, and the like, as will be explained in more detail below. Accordingly, once the face pair is identified, object tracking 206 can begin and the face pair is stored in memory.

Accordingly, in tracking mode 206, a subsequent frame from the left camera 106a and right camera 106b is analyzed to detect the primary user's face from image to image using tracking-by-detection. If, however, a face is not detected in an image within a sequence of images, a second tracking algorithm, such as a Median Flow Tracker (MFT), can be used. Then, in a subsequent frame, the process of attempting to detect the face pair using tracking-by-detection can resume. Therefore, if the face pair is detected in a previous frame, tracking-by-detection is performed. If the face pair is not detected in the previous frame, the second tracking algorithm is used.

Further, in tracking mode 206, the tracking algorithm returns information for a bounding box containing a respective representation of a face and features of a user's face are extracted from within the bounding box for each image to determine an output for the location of a user's eyes, mouth, or one or more points relative to these features, for example, that is smoother and reduces jitteriness relative to simply providing the current location of these features. The change in position of these features between subsequent images can be used to determine what output or to adjust an output for a current location of these features. For example, the change in position of optical flow of a user's eyes can be calculated for a current and previous image. If this change in position is less than a first threshold, then the position of the user has only slightly changed relative to their position in the previous frame. Since this change is small, the user's current eye position can be reasonable estimated as their location in the previous frame, as if the user hasn't moved. In another example, if this change is between the first threshold and a second threshold, a single point tracking algorithm can be used to track the user's eyes between these two frames. If, however, this change in optical flow is greater than the second threshold, the current position of the user's eyes can be used. In this instance, the tracking output will appear quite jittery, however, since the change in eye position is so great (i.e., greater than the second threshold) the user has moved quickly or abruptly and, thus, an abrupt change, in this instance, would not only be acceptable, it would likely be expected. Once the current location of the eyes, in this example, is determined for each image captured by each camera, stereo disparity between this current location between these images is determined. The stereo disparity is then used to determine a z-depth for the eyes, by calculating a distance between the eyes and the computing device, in order to determine a three-dimensional position (x, y, z) of the eyes relative to the computing device.

Figure 3:
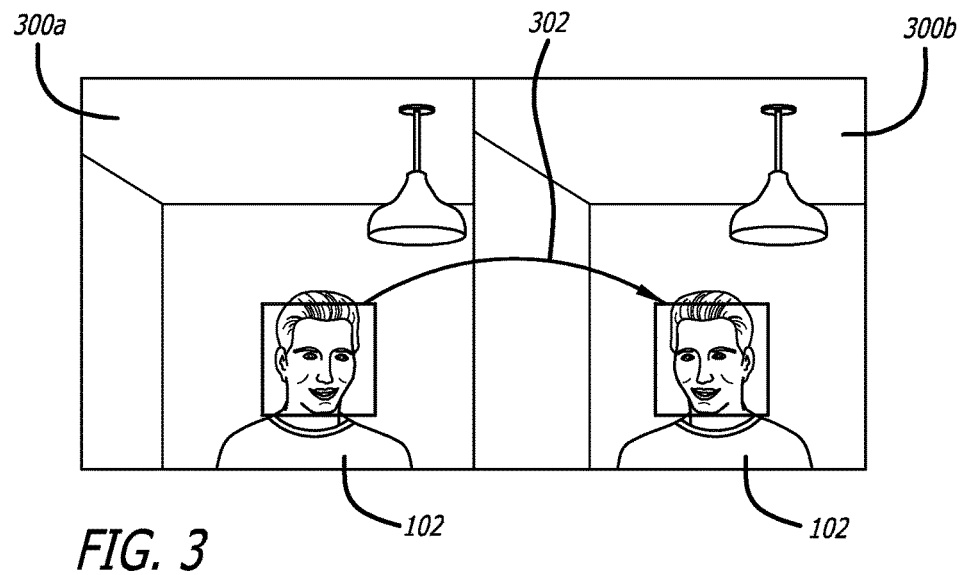
FIG. 3 illustrates an example wherein a face of the user is identified in image information captured using two of the multiple cameras of the computing device in accordance with at least one embodiment.

FIG. 3 illustrates an example face paring process wherein left image 300a of user 102 is matched in right image 300b to create a face pair in accordance with at least one embodiment. Once one or more faces has been detected in one or more cameras (106a, 106b, etc), the face must be verified in order to ensure that the correct face is being tracked and to resolve any discrepancies between the detected face outputs between images (300a, 300b). The face paring process is the first part of a stereo association step wherein, upon detecting the presence of a user, computing device 104 cause compares 302 the representation of the face of user 102 in left image 300a to the representation of the face of user 102 in right image 300b to determine the similarity between user 102 in each image (e.g., normalized cross-correlation (NCC)). In one example, this includes calculating and comparing an intensity histogram of a bounding box for each representation of the face between these two images to determine whether these two faces match. If the face in left image 300a and the face in right image 300b have, for example, an NCC score above a determined threshold, they are considered a match. Accordingly, each of cameras 106a and camera 106b then assign the matching face the same ID to ensure that each camera is tracking the same or correct face. Therefore, in this example, user 102 is detected in each of images 300a and 300b, a first representation of his face in image 300a is associated with a second representation of his face in image 300b by assigning the same tracking ID to each representation detected by each camera (106a, 106b), and his face is ready to be tracked by the tracking algorithm.

Figure 4:
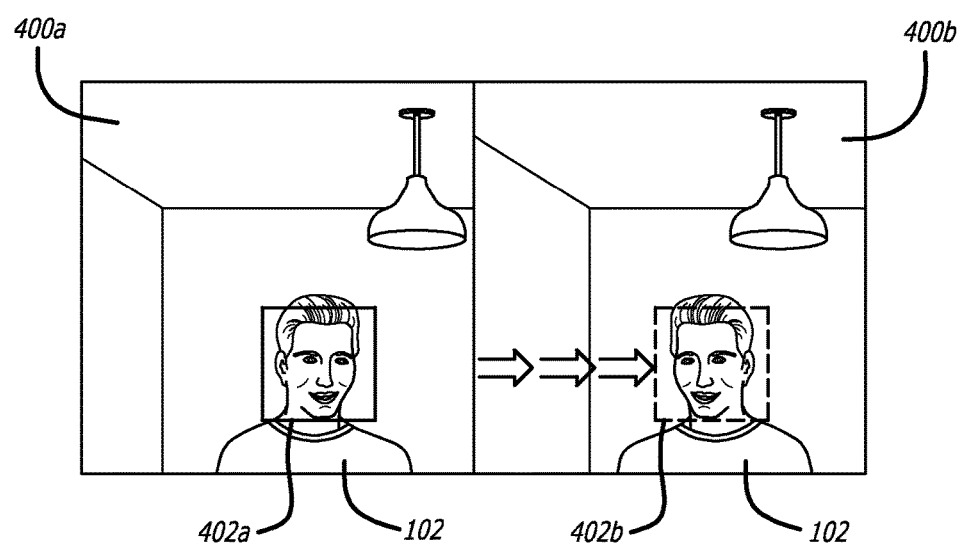
FIG. 4 illustrates an example wherein a user's face is identified in an image from a second image capturing element using image data of the face captured using a first image capturing element in accordance with at least one embodiment.

FIG. 4 illustrates a second part of the stereo association step wherein a face of user 102 is detected in left image 400a but not detected in right image 400b in accordance with at least one embodiment. Accordingly, an attempt is made to recover or detect a missing face when a face is detected in image data from, for example, cameras 106a but is not detected in image data from camera 106b. Therefore, in order to detect the missing face, features of the detected face are used to analyze the image in which the face was not detected using, for example, a template matching algorithm. In this example, the face detection algorithm has detected the face of user 102 in image 400a, as identified by bounding box 402a, however, the face has not been detected in image 400b, as identified by dashed bounding box 402b. Therefore, features of the face from image 400a are extracted and used to search for and match at least a portion of a corresponding face that may or may not be present in image 400b. Accordingly, in this example, the user 102 present and his face is detected. Therefore, as above, user 102 has been detected in each of image 400a and 400b, his face is assigned the same tracking ID), and his face is ready to be tracked by the tracking algorithm.

Figure 5A:
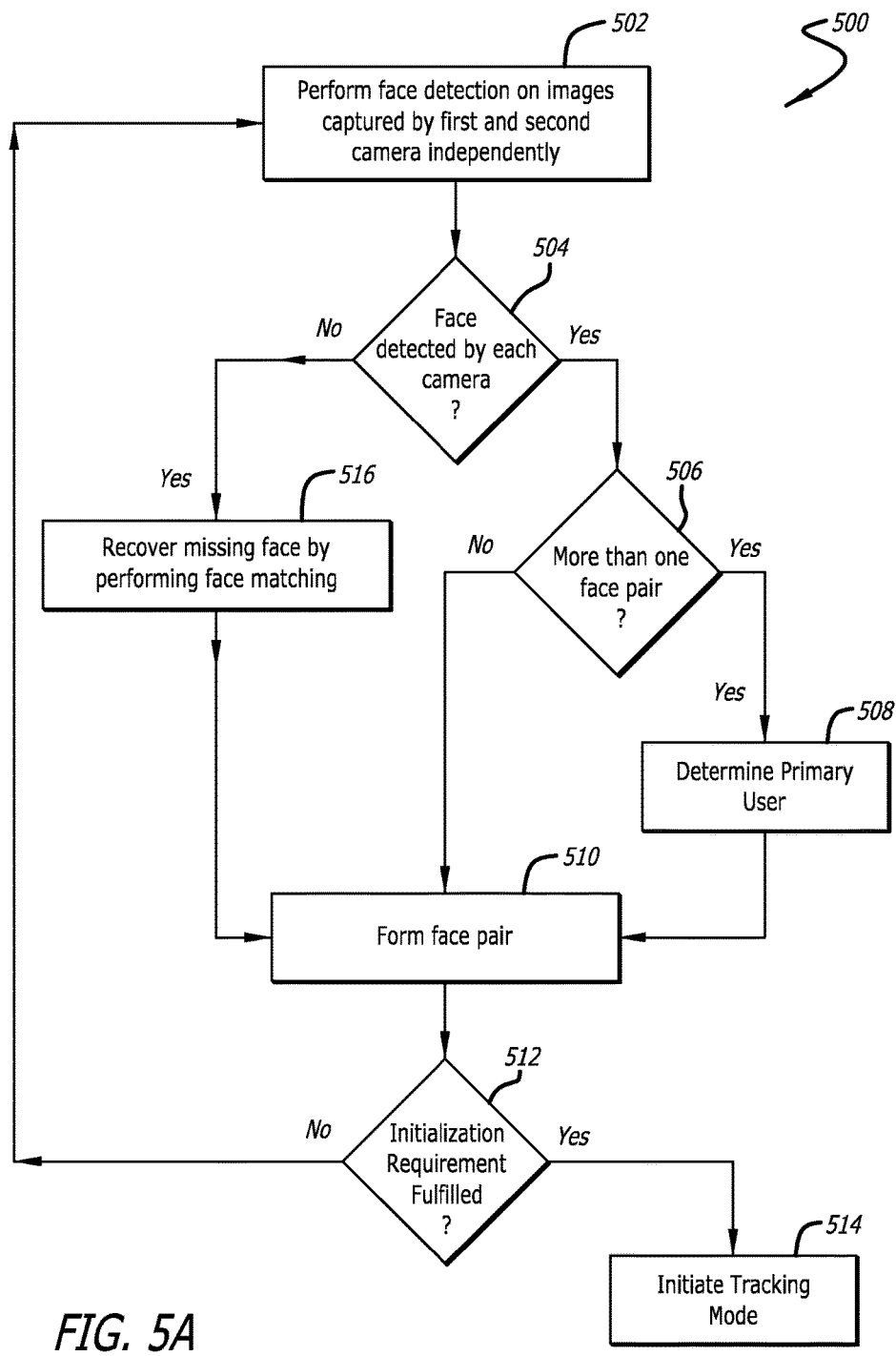
FIG. 5A illustrates an example tracking initialization process for identifying a missing face and determining a primary user in accordance with various embodiments.

FIG. 5A illustrates an example process 500 associated with a tracking initialization mode that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, face detection is performed on images captured or obtained from a first camera and second camera independently 502. The face detection algorithm is used to detect and determine where a representation of the user's face is positioned in the images. Approaches for detecting a user's face (e.g., eyebrows, eyes, nose) can be based on feature detection, background subtraction, segmentation, supervised learning, among others. Feature-based detection approaches generally involve extracting features from an image and applying various rules, metrics, or heuristics to determine whether a user's face is present in the image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). Geometric rules can also be applied to analyze the spatial relationships among various facial features. Skin color can also be used as a basis for detecting and/or tracking a user because skin color comprises a limited range of the color spectrum that can be relatively efficient to locate in an image.

At decision block 504, if a face is detected by each camera, an intensity histogram for a bounding box corresponding to each face in each image is generated. One or more intensity histograms for a first image are compared to a second image to determine whether the faces all match. For example, if a single face is detected in the first image and the second image, an intensity histogram for the face detected in the first image will be compared to the face detected in the second image to determine whether the faces captured by each camera match. If all the faces match at block 504, a determination is made as to whether there is one matching face in each image or if there are two or more matching face pairs between the two images 506. Accordingly, if there is one face pair (e.g., a single face detected in a first image matches the single face detected in a second image) 506, a face pair is formed 510. If, however, there is more than one matching face (e.g., two users are present) 506, then a primary user between these faces is determined 508. In one example, the primary user is assumed to be the user holding the computing device; therefore, the primary user will appear larger in size relative to a secondary user behind them. Therefore, the larger user or face can be one example of how to determine the primary user. In another example, the primary user is assumed to be closest to the device. Stereo disparity can be used to calculate the distance to each respective user and the user closest to the computing device can be identified as the primary user. Instead of calculating the distance to each user, stereo disparity alone can be used. In this example, a face with the larger stereo disparity is closer to the computing device relative to a face with a smaller disparity. Additionally, the primary user is assumed to be relatively centered in the image relative to a secondary user. Any one of these plus other heuristic methods can be used individually or in combination to determine a primary user in an image with multiple users. Accordingly, once the primary user has been determined, the face pair is formed 510.

Further, referring back to decision block 504, if a face is not detected in second image, but is detected in the first image, face matching is performed to recover or detect the missing face in the second image where the face was not detected 516. In this example, since the missing face has been recovered, the face pair is formed 510, as described above.

Accordingly, in order to ensure the computing device is not unnecessarily wasting computing and battery resources, the computing device can be instructed to initiate the face tracking mode upon fulfilling a tracking initialization requirement, such as detecting a threshold number of matching face pairs in consecutive images. In one example, the occurrence or detection of the face pair is stored by a counter when a face pair is formed 510. Thus, for each new consecutive face pair occurrence or detection, the algorithm may determine whether a tracking initialization requirement has been fulfilled 512. For example, the requirement can be fulfilled by detecting five face pairs in five consecutive images. If a threshold number of face pairs have been detected and the tracking initialization requirement has been fulfilled 512, tracking mode can be initiated 514. If, however, the threshold number of face pairs has not been detected and the tracking initialization requirement has not been fulfilled 512, the process of performing face detection on subsequent images is repeated until the threshold has at least been met 502.

Figure 5B:
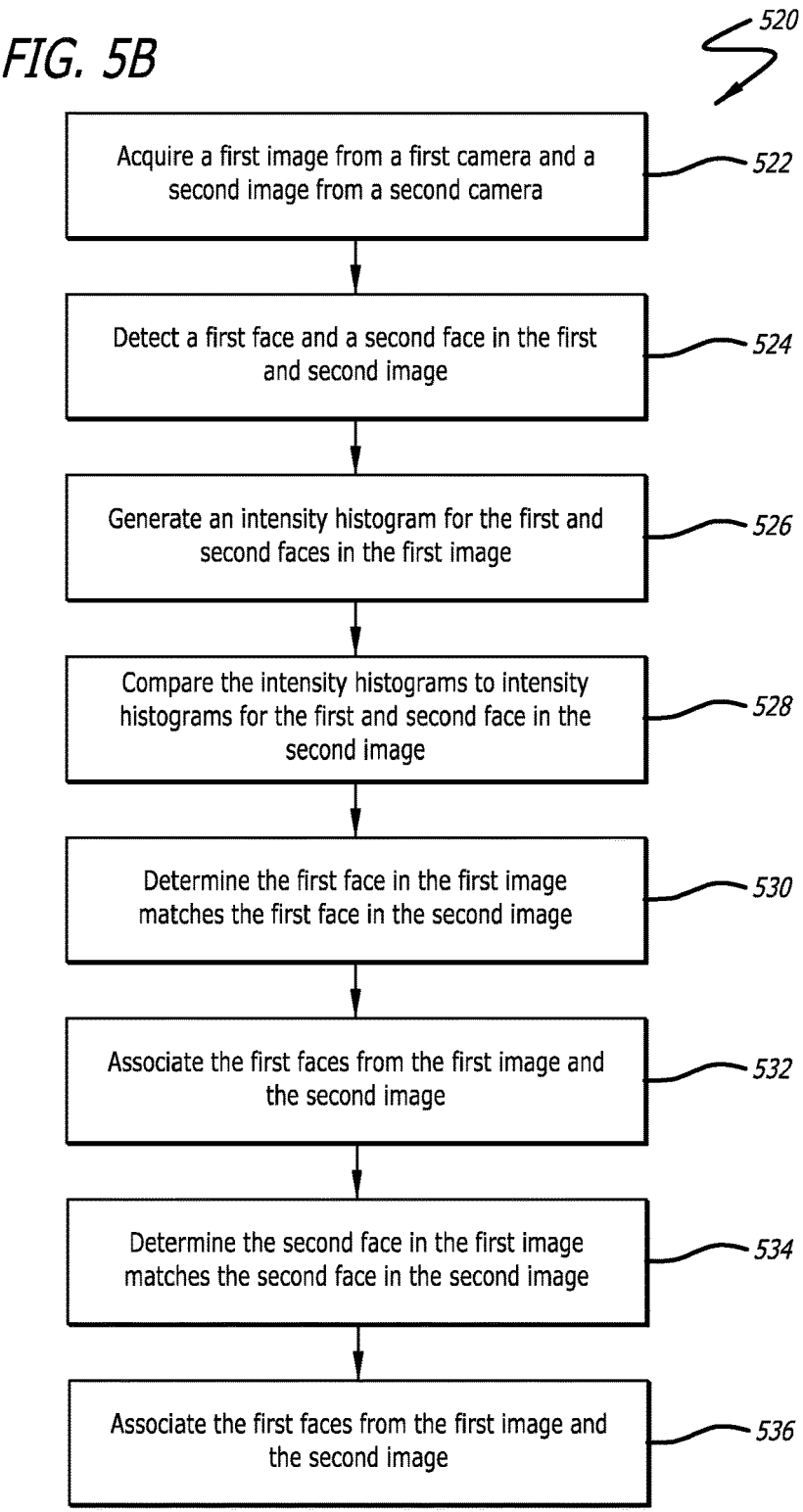
FIG. 5B illustrates an example process for associating user corresponding faces between cameras in accordance with various embodiments.

FIG. 5B illustrates example process 520 for associating user corresponding faces between cameras that corresponds to decision block 506 discussed with respect to FIG. 5A that can be used in accordance with various embodiments. In this example, a first image is acquired from a first camera and a second image is acquired from a second camera 522. The first and second cameras, in this example, have overlapping fields of view enabling depth information for a respective face to be determined. In this example, a first face and a second face are detected in the first and second image using a face detection algorithm 524. For example, the first image could be captured using a camera on a right side of the computing device, thereby, providing a first right representation of the first face and a first right representation of the second face. Similarly, the second image could be captured using a camera on a left side of the computing device, thereby, providing a first left representation of the first face and a first left representation of the second face. In this example, the face detection algorithm can return data identifying a first right bounding box for the first face and a first right bounding box for the second face in the first right image data. Similarly, a first left representation of the first face and a first left representation of the second face in the first left image data. The face detection algorithm can also return a first left bounding box for the first face and a first left bounding box for the second face in the first left image data.

In this example, intensity histograms for the first face and second face are generated 526. Accordingly, a first right intensity histogram corresponding to the first face is compared to the first left intensity histogram corresponding to the first face 528. In this example, the first face in the first image is determined to match the first face in the second image 530. Accordingly, the first face from the first image is associated with the first face from the second image 532. In this example, the second face in the first image is determined to match the second face in the second image 534 and the second face from the first image is associated with the second face from the second image 536.

FIG. 5C illustrates an example process 540 for recovering an undetected face in an image that can be used in accordance with various embodiments. In this example, a first image is acquired from a first camera and a second image is acquired from a second camera 542. Accordingly, a first face and a second face are detected in the first image 544. In this example, only the first face is detected in the second image and the second face is not detected 546. In order to properly match the correct face, the first face and the second face detected in the first image are compared to the first face in the second image 548. Accordingly, the first face from the first image is matched with the first face in the second image 550. Thus, in order to recover the missing second face from the second, a template of the second face is generated from the the second face from the first image 552. In one example, the template can be generated by extracting features of the second face from the first image. Accordingly, the template for the second face is used to analyze and compared to features within the second image using a template matching algorithm 554. In this example, the second face is detected in the second image using the template 556.

FIG. 6 illustrates an example process 600 for determining a primary user that can be used in accordance with various embodiments. In this example, a first image is captured using a first camera and a second image is captured using a second camera at a first time 602. For example, as mentioned above, the first image can be a right image captured with a right camera and the second image could be a left image with a left camera. Accordingly, a right representation of a first face and a right representation of a second face are detected using a face detection algorithm 604. The face detection algorithm, in this example, can return a first right bounding box for the first face and a second right bounding box for the second face. Additionally, a left representation of the first face and a left representation of the second face in the left image are also detected 604 using the face detection algorithm, which also returns a first left bounding box for the first face and a second left bounding box for the second face.

In this example, disparity information corresponding to a first displacement between the first right bounding box in the right image and the first left bounding box in the left image is determined for the first face 606. Accordingly, a second displacement between the second right bounding box in the right image and the second left bounding box in the left image is also determined for the second face 606. Since a bounding box is an estimate for a current location of the face in a respective image, the bounding boxes from each image can sometimes appear to lineup (i.e., no disparity between bounding boxes) when the respective face in each camera does not (i.e., there is disparity between faces). Accordingly, in at least one embodiment, image data from within each bounding box, such as the user's head, face features, or identified feature points, could be used to determine the disparity information. Using the disparity information, a distance (e.g., in meters) between each face and the computing device, in this example, is determined 608. Alternatively, instead of triangulating the distance to each face or user using the disparity, the disparity length between face representations in each image can be measured or determined (e.g., in pixels, millimeters, etc.). In this example, the face with the larger disparity is closer to the computing device. Accordingly, one of the first face or the second face satisfying, in one example, two or more of a first selection criterion corresponding to bounding box size (e.g., number of pixels), a second selection criterion corresponding to disparity or distance between a respective face and the computing device, or a third selection criterion corresponding to a respective face nearest a center of the first image and the second image is selected 610 as a primary face for a face tracking algorithm to track in subsequent images.

Since the primary user is likely going to be closer to the computing device relative to a secondary user, the face corresponding to the primary user can be assumed to be larger relative to the secondary user. Accordingly, the first selection criterion is satisfied by a face with the largest bounding box. This can be determined by calculating the area of each bounding box in pixel space, for example, and comparing the relative sizes. The second selection criterion corresponding to disparity or distance between a respective face and the computing device is determined by first calculating the stereo disparity between respective faces in each image.

In another example, a first average distance to center between the first right bounding box and a right image center and the first left bounding box and a left image center is calculated to determine the third selection criterion corresponding to the respective face nearest the center of the first image and the second image. In one example, the image center corresponds to a line positioned at the horizontal middle of an image frame or a single two-dimensional point at the vertical and horizontal middle of an image frame. In another example, the image center corresponds to a line positioned at the horizontal middle of a respective field of view of a particular camera or a single two-dimensional point at the vertical and horizontal middle of the respective field of view. Accordingly, a second average distance to center between the second right bounding box and the right image center and the second left bounding box and the left image center also determined. Thus, a face with the shortest average distance to center can be reasonable estimated as the primary user since a user looking at a display screen of a computing device will most likely be viewing the display screen at roughly a normal angle (i.e., straight on). In one example, the distance to center can be determined using pixels (e.g., 50 pixels from a center of a bounding box and a respective image center, etc.), millimeters, or any other appropriate unit of measurement.

Since the primary user is likely going to be closer to the computing device relative to a secondary user, the face corresponding to the primary user can be assumed to be larger relative to the secondary user. Accordingly, the first selection criterion is satisfied by a face with the largest bounding box. This can be determined by calculating the area of each bounding box in pixel space, for example, and comparing the relative sizes. The second selection criterion corresponding to disparity or distance between a respective face and the computing device is determined by first calculating the stereo disparity between respective faces in each image. Generally, in order to determine or triangulate distances to various objects, displacements for similar features of these objects are determined between these images and a depth is assigned based at least in part upon the lateral difference in location of each feature in each respective image (closer objects will have a greater lateral displacement relative to farther objects). Thus, objects closest to the camera, such as a user's face or hand, will have the greatest amount of disparity, displacement, or horizontal offset between images. Objects in the background, such as a painting on the wall, will have a very small amount of disparity. Objects between the user and wall will have some intermediate amount of disparity based upon the relative distance of these objects from the computing device (i.e., cameras).

Accordingly, the amount of disparity is inversely proportional to the distance from the cameras, such that there can be significantly more disparity in a near camera field (e.g., 0-1 m) than in a far field (e.g., 1 m-infinity). Further, the decrease is not linear but decreases more quickly near the computing device than at a distance, as objects in the distance can have little to no disparity regardless of whether they are twenty feet away or a mile away. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

For example, the amount of disparity, D, at a given distance, d, can be given by:

$$D = \frac{f \times B}{d}$$

Where configuration data, such as the focal length f of each of camera and B is the baseline, or distance between the viewpoints of the cameras based at least in part upon their relative positions and separation is fixed. For example, if the focal length of a VGA camera is four hundred pixels and the baseline is five centimeters, for a distance of one meter the disparity would be twenty pixels. Additionally, configuration data can be obtained that can include information such as the resolution and field of view of each camera, a separation of the cameras, and other such information.

After the face pair has been formed between cameras (106a, 106b) and face pair information stored for these frames, the faces are temporal associated through each consecutive frame to ensure the same face is tracked by each camera (106a, 106b) when, for example, there are multiple faces in the scene. Additionally, temporal association also helps determine when, for example, a first user hands the computing device to a second user. In this instance, temporal association can determine and, thereby, track a new primary user. Accordingly, temporal association stores a memory of faces detected by the face detection algorithm in a most recent frame. Therefore, the face detection algorithm attempts to detect a face in each frame and, if a face pair exists in the "memory" queue (e.g., most recent frame) and the face detection algorithm finds one or more faces in a current frame, the tracking algorithm will pick the detected face d detected in the current frame i that has the highest similarity score S, with respect to other detected faces d" stored in the memory, that is greater than a threshold score β. For example, for a respective detected face $d_t^i$ of an $i^{th}$ frame at time t, if $$d_t^i s(d_t^i, d_{memory}) > \beta d_t^i$$

$$s(d_t^i, d_{memory}) > S(d_t^i, d_{memory}) \text{ if } j \neq i,$$

Where $S(d_t^i, d_{memory}) = \max\{S(d_t^i, d_{memory}^1), \ldots, S(d_t^i, d_{memory}^k)\}$ The similarity score can be computed using:
$S(d_t^i, d_{t-1}^k) = S_{appr}(d_t^i, d_{t-1}^k) \times S_{pos}(d_t^i, d_{t-1}^k)$, where pos refers to two detected faces position similarity and appr refers to the two faces appearance similarity. To compute the position similarity score:

$$S_{pos}(d_t^i, d_{t-1}^k) = \exp\left(-\left(\frac{\Delta x^2 + \Delta y^2}{\rho^2}\right)\right)$$

To compute the appearance similarity score:

$$S_{appr}(d_t^i, d_{t-1}^k) = \alpha$$

If, however, the face found in the current frame is different from any of the faces stored in memory, the tracking algorithm will not pick any face to track, but can, in some instances, initiate a new tracking session. Temporal association, therefore, links detected faces through a video sequence by, for example, assigning a face ID to the same detected face in each consecutive frame and assigning a different face ID to other faces as they appear in later or concurrent image frames. In one example, temporal association can prevent the tracking algorithm from locking onto and tracking the incorrect user at the end of a device gesture, for example, provided using a user's hand that obscures the primary user's face when there is more than one user in the image frame.

Figure 7:
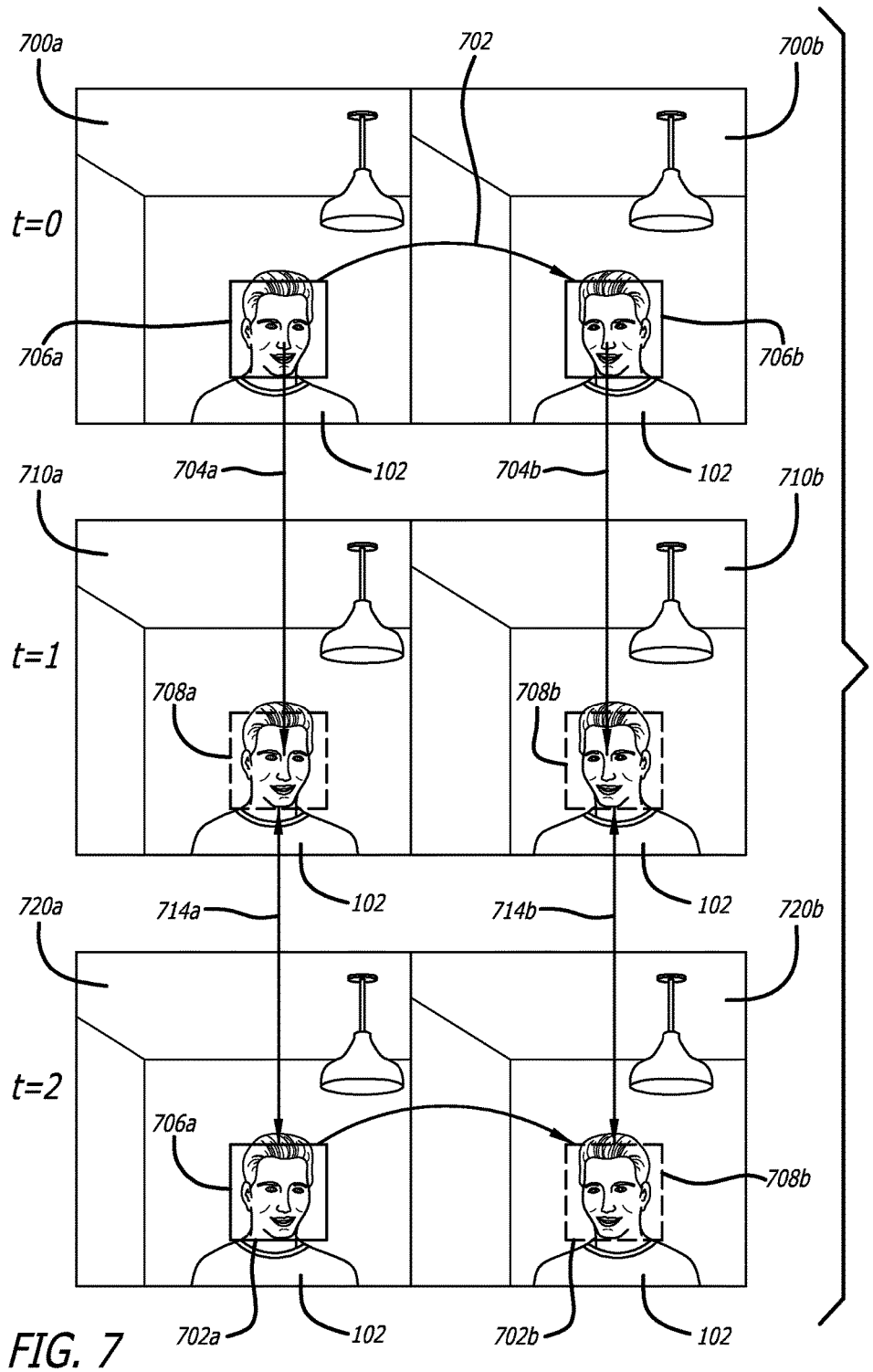
FIG. 7 illustrates an example wherein a face of a user is tracked using two image capturing elements of a computing device in accordance with at least one embodiment.

FIG. 7 illustrates an example wherein a face of user 102 is tracked using two image capturing elements in accordance with at least one embodiment. In this example, a face detection algorithm, as part of a tracking-by-detection process, independently analyzes first image 700a and first image 700b (e.g., t=0) to detect a face of user 102. Accordingly, in this example, the face detection algorithm detects a face in image 700a, as identified by first left bounding box 706a, and image 700b, as identified by first right bounding box 706b. Stereo association 702 between these images is performed to determine that the face in each image matches and to determine a primary user in the event more than one face was initially detected. Since this is the first image frame pair in which user 102 is detected, in this example, temporal association is not performed (e.g., there is no previous history, no prior stored face detection).

Accordingly, once second image 710a and second image 710b (e.g., t=1) are captured these images are, as above, analyzed by the face detection algorithm to detect the face of user 102. In this example, however, the face detection algorithm does not detect the face, as identified by second dashed left bounding box 708a and second dashed left bounding box 708b, which the face detection algorithm detected previously in image 700a and image 700b. Therefore, stereo association is not performed and one way arrows 704a and 704b denote that there is no temporal association, since the face was not detected in these images. In order to ensure that the face detection algorithm has not simply failed to recognize the face, a second tracking algorithm is used on or applied to second image 710a and second image 710b, such as a Median Flow Tracker (MFT). Instead of attempting to detect a face in second image 710a and second image 710b, MFT may sample a first set of points of the face of user 102 from the previous frames (e.g., first image 700a and first image 700b). The MFT can then apply an optical-flow algorithm on second image 710a and second image 710b using this first set of points to identify a second set of points potentially corresponding the face of user 102 in second image 710a and second image 710b. The median displacement of these points can then be determined using forward-backward flow errors and Normalized Cross Correlation (NCC) to eliminate points of the second set that are below a third threshold value, which do not correlate well enough and are, therefore, considered no good. Accordingly, the current position of the face of 102 in second image 710a and second image 710b can be estimated using points of the second set of points that are above this threshold value. Therefore, even though the face detection algorithm did not detect the face of user 102 in this set of frames, the current position at t=1 can still be determined using the second tracking algorithm.

In a third set of image frames, third image 720a and third image 720b (e.g., t=2), the face detection algorithm detects the face of user 102 in image 720a captured by left camera 106a, but does not initially detect the face in image 720b, as identified by third dashed right bounding box 708b. In order to recover the face, stereo associated is performed. Accordingly, using information of the face captured in image 720a, a template matching algorithm can analyze image 720b. In one example, missing face recovery is only performed on a camera pair with a relatively short baseline. In other examples, attempts to recover the missing face may be made in all instances. Thus, in this example, template matching uses points, contours, or the like of the face detected in image 720a as a template to match against second image 720b in an attempt to find small parts of the template in image 720b. Accordingly, in this example, after performing template matching, the face of user 102 is recovered from image 720b. Once the face has been recovered in image 720b, temporal association, as denoted by two-way arrows 714a and 714b, can associate the faces from images 710a and 710b to 720a and 720b and the second tracking algorithm can remain idle.

In at least one embodiment, in order to handle a situation where there is more than one user more robustly, a secondary user's face (i.e., non-target face) is also stored in memory. For example, $$S(d_t^i, d_{memory}^{target}) > \beta$$

$$S(d_t^i, d_{memory}^i) > S(d_t^j, d_{memory}^j) \text{ if } j \neq i$$

$$S(d_t^i, d_{memory}^{target}) > S(d_t^i, d_{memory}^{non-target}).$$

Figure 8:
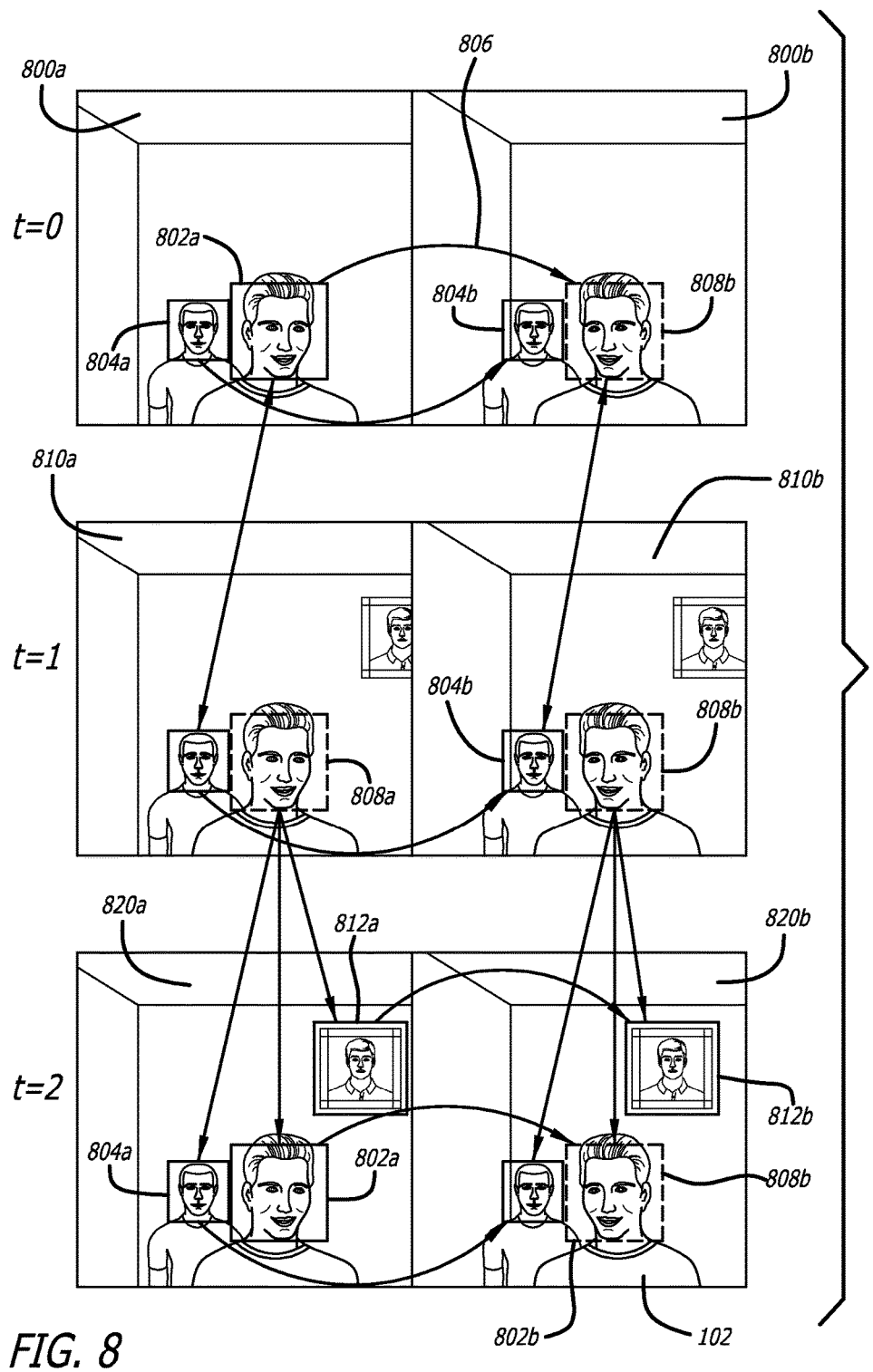
FIG. 8 illustrates an example wherein two users are tracked using two image capturing elements of a computing device in accordance with at least one embodiment.

Thus, FIG. 8 illustrates an example wherein two faces are tracked using two image capturing elements in accordance with at least one embodiment. In this example, the face detection algorithm, as above, independently analyzes first image 800a and first image 800b (e.g., t=0) to detect a face of user 102. In this example, however, three are two users. Accordingly, in this example, the face detection algorithm detects a first face, as identified by bounding box 802a, and a second face, as identified by second left bounding box 804a, in first image 800a. In image 800b, however, only the second face is detected, as identified by second right bounding box 804b and dashed right bounding box 808b. As described above, stereo association 806 between these images is performed to determine which face in each image matches, recover the missing face, and to determine the primary user. Since this is the first image frame pair in which user 102 is detected, in this example, temporal association is not performed.

Accordingly, once second image 810a and second image 810b (e.g., t=1) are captured these images are, as above, analyzed by the face detection algorithm to detect the two faces. In this example, however, only the face of the secondary user is detected and the face of the primary user is not detect in either image 800a or image 800b, as identified by first dashed left bounding box 808a and first dashed right bounding box 808b. Stereo association, in this example, pairs up the face of the secondary user and temporally associates the secondary user from the previous images, but rejects this user for tracking purposes based on the previous images where user 102 was determined as the primary user. Thus, in these images, no stereo or temporal association is performed with respect to the primary user 102. Accordingly, the second tracking algorithm is then used on second image 810a and second image 810b to track the primary user, as described above. Accordingly, the current position of the primary user's face in second image 810a and second image 810b can be estimated based on the results from the previous frame.

In a third set of image frames, third image 820a and third image 820b (e.g., t=2), the face detection algorithm now detects what it thinks are three faces; one for the primary user 102, a second of the secondary user, and a third, which is actually a framed picture that has come into view in third images 820a and 820b. As in other examples, stereo association recovers the face of the primary user from image 820b, using techniques discussed above, and pairs up the face of the primary user, as identified by bounding boxes 802a and 802b, the face the secondary user, and framed picture identified by bounding boxes 812a and 812b. Each of these detections are temporally associated from the previous frames, but the secondary user and framed picture are rejected for tracking purposes and the second tracker is not run, in this example, because tracking-by-detection can be performed using the position of the face of the primary user from the previous frames that was determined by the second tracker.

Figure 9:
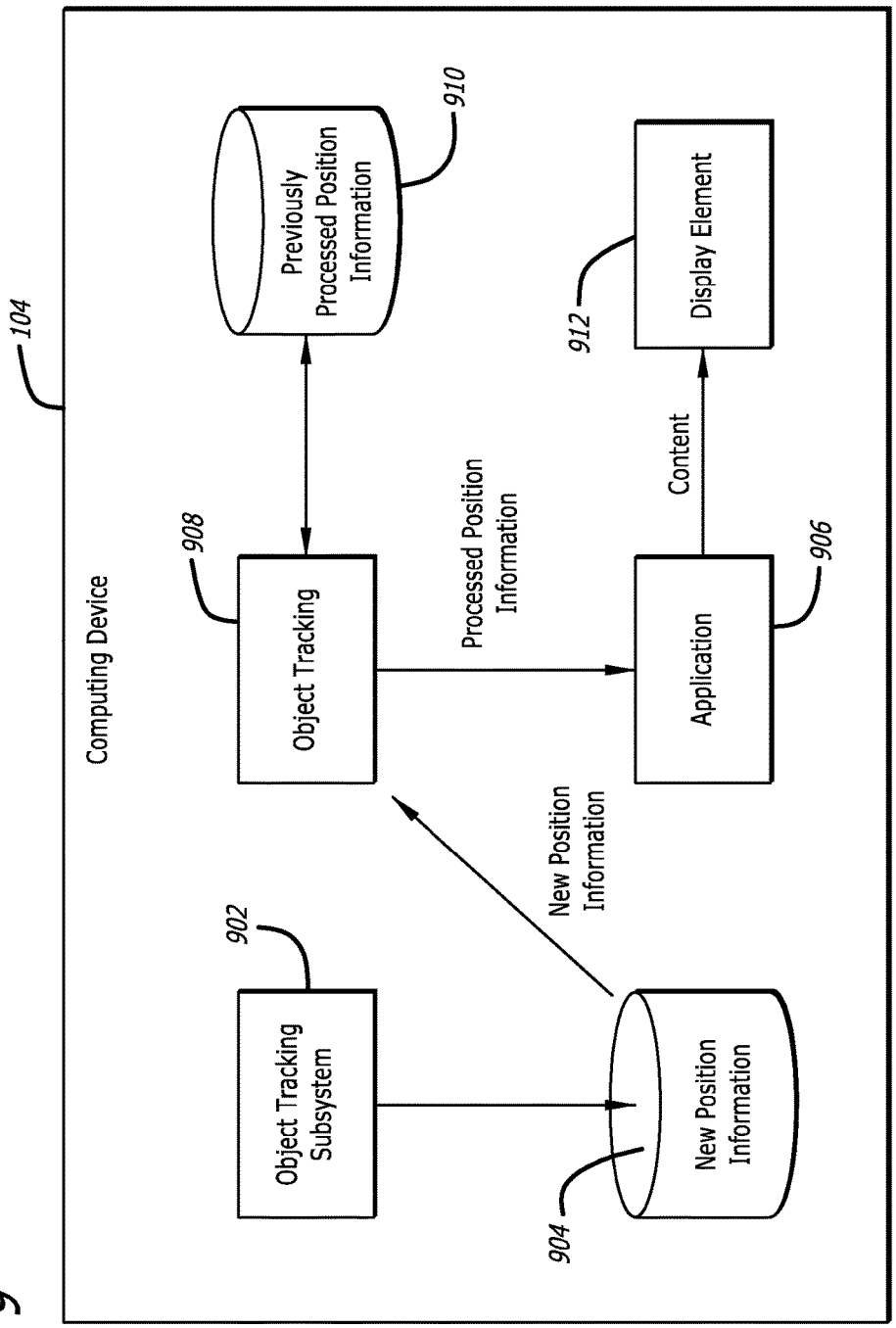
FIG. 9 illustrates example object tracking components in accordance with at least one embodiment.

FIG. 9 illustrates example object tracking components of computing device 104 in accordance with at least one embodiment. It should be understood that although this example shows these components inside computing device 104, any one or all of these components and their equivalents could reside on a server in communication with computing device 104. In this example, however, computing device 104 includes object tracking subsystem 902 that can provide new position information corresponding to a position of an object or user with respect to the computing device, new position data store 904 that can store at least new position information, at least one application 906 utilizing the tracking information, object tracking application 908, previous position data store 910 that can store position information for one or more tracking sessions, and display element 912 that can render content that has been generated based at least in part on the position information. As described, computing device 104 can acquire object tracking information (e.g., position information of an object with respect to the device) and provide the information to applications, services, and the like for purposes such as rendering content on display element 912.

For example, object tracking subsystem 902 can provide position information corresponding to a position of an object (e.g., a viewer's head) where the position information can be determined from images captured by one or more cameras of the device, a gyroscope, an accelerometer, and the like. The position information (i.e., new position information) can be stored in data repository 904, provided to application 906. For example, one or more optimization algorithms or equations can be used to smooth, average, or otherwise process the new position information. The optimization algorithms can include, for example, moving average algorithms or other smoothing algorithms. The moving average algorithms can include, for example, a simple moving average, a cumulative moving average, a weighted moving average, an exponential moving average, among others. The simple moving average (SMA) is an unweighted mean of the previous n datum points (e.g., position data). In this example, the new position information can be representative of a position of a face within an image, where the new position can include physical space coordinates (e.g., x, y, and z) of the face. Accordingly, using a camera of computing device 104, one or more images of a user's face can be acquired, and by analyzing the image, position information indicative of a position of the user with respect to computing device 104 can be determined. In one example, one or more head or face detection algorithms can be applied to extract or detect features of the user's face. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. Detecting the features can include identifying unique or distinguishing points, facial marks, geometric shapes or distances, or other such features on the face. Example facial features can include at least one of an eye, mouth, nose, among other facial features. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. Accordingly, the position information and feature information can be stored in data repository 910 or other storage component for use as previous position information for both temporal association and by the second tracker if the face is not detected in the current frame.

Figure 10:
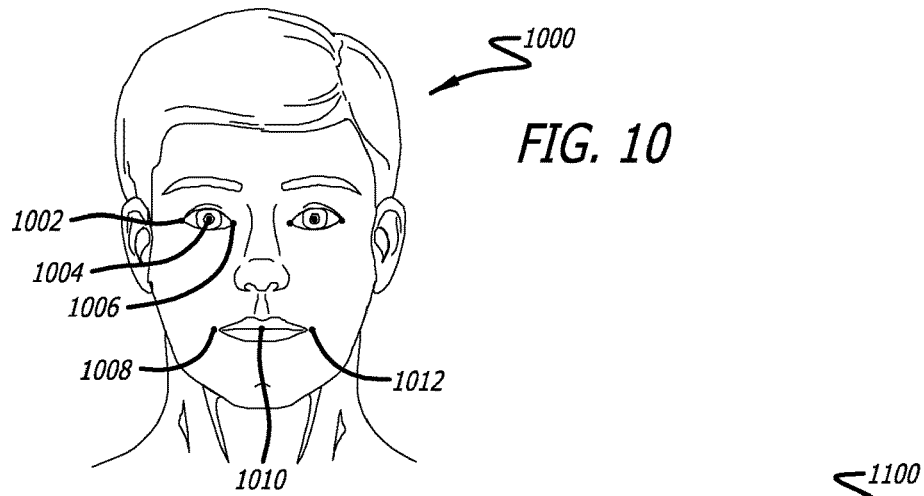
FIG. 10 illustrates example facial points that can be used to detect and track a user in accordance with at least one embodiment.

FIG. 10 illustrates example facial points that can be used to detect and track head 1000 of user 102 in accordance with at least one embodiment. Face Detection using one or more of the algorithms thus far discussed, return a rough bounding box corresponding to the position of a face. The bounding boxes returned by these algorithms tends to jitter (e.g., 1-10 pixels, depends on face size) around the actual position between image frames and this tends to happen even when the image quality remains constant. Therefore, in order to provide a more stable (i.e., less jittery) output, features of a face are extracted from the region corresponding to the inside portion of the bounding box (returned by the face detection algorithm) using a feature extraction algorithm. Accordingly, key facial points on the face, such as outside eye point 1002, eye center 1004, inside eye point 1006, right mouth point 1008, mouth center 1010, and left mouth point 1012, can be extracted and tracked. Tracking these features provides advantages relative to other face and head tracking algorithms in certain situations, but also does not work as well as these algorithms in other situations. For example, since these are much smaller or finer features relative to a bounding box, the location of these features is more precise. Further, recognizing these features is also relatively fast (e.g., 1-2 ms). Feature tracking, however, can run into problems if a user is wearing glasses or other accessories or if the user is near an image boundary. Since the features that are tracked are much smaller relative to a head, however, the output can be quite jittery, even when the user isn't moving relative to the computing device or camera. The jitters tend to be several pixels around the eye coordinates and such pixel detection error, though maybe small, in the image domain can translate into a much big error in the physical space. Thus, it would be advantageous to use feature tracking in some instances, but not always.

Figure 11:
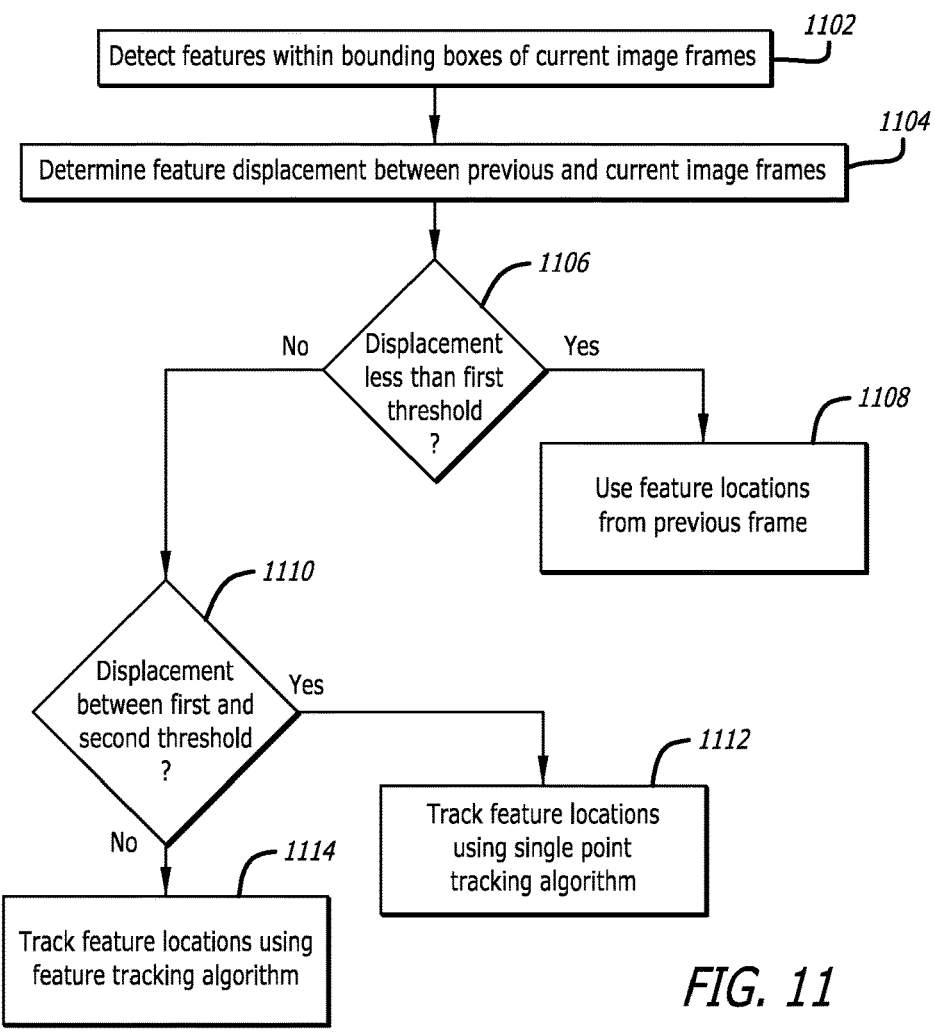
FIG. 11 illustrates an example eye tracking process in accordance with various embodiments.

FIG. 11 illustrates an example eye tracking process 1100 that can be used within the scope of various embodiments. In this example, features of a user's face are extracted from each image using a feature location or extraction algorithm. In this example, features within bounding boxes of a current image are detected 1102. The eye displacement or change between a current and previous set of images is determined using optical flow algorithm, for example 1104. Accordingly, if the displacement is less than a first threshold 1106, the user can be estimated to not have moved and, therefore, the position of the user's eyes in the previous image can be returned as the user's current head position 1108. Additionally, a midpoint between the two eyes or mouth in each image can also be used. If, however, the displacement is between the first threshold and a second threshold 1110, a position of the user's eyes in the second set of images determined a single point tracking algorithm is returned 1112. If the displacement, however, is greater than the second threshold 1110, the user has moved abruptly and, thus, the current location of user's eyes in the current image determined using the feature extraction algorithm is returned 1114. In this last example, although using the position information the feature location algorithm tends to be jittery, jitteriness is more expected or acceptable when a user makes an abrupt movement.

Figure 12:
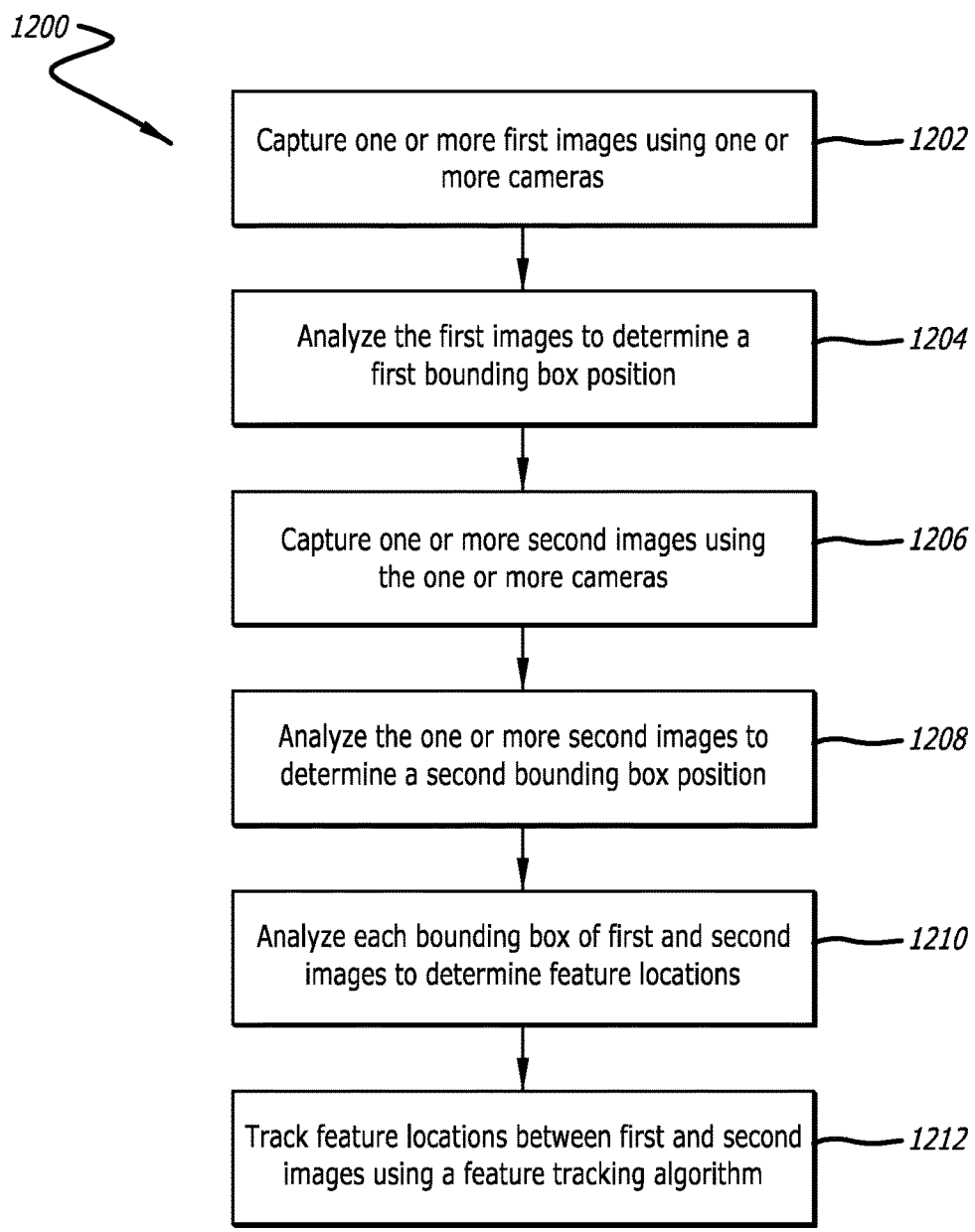
FIG. 12 illustrates an example tracking process in accordance with various embodiments.

FIG. 12 illustrates an example head tracking process 1200 that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, one or more first images are captured using one or more cameras of a computing device 1202. For example, a left camera and a right camera can capture an image substantially simultaneously to determine stereoscopic image information for a respective capture. In some examples, three, four, or more cameras could be used. Accordingly, these first images are subsequently analyzed using a head location or face detection algorithm to determine a first bounding box position 1204. In this example, one or more second images are captured using the cameras 1206. As above, these second images are also analyzed by the head location or face detection algorithm to determine a second bounding box position 1208.

In this example, since a face of the user is detected in both sets of images, temporal association can be performed to link the same user's face through these two sets of images and beyond into a more numerous sequence of images. If, for example, the user was not detected in the second images, a second tracking algorithm, such as the MFT algorithm described above, could be applied to these two sets of images to determine the approximate location of the user, so that the tracking process can continue. Then, in a next set of images, if the face is detected, tracking by detection can resume.

Thus, the face detection algorithm returns information corresponding to a location of the face in the form of a bounding box (e.g., a set of points in image space within which the face is bound). Facial feature locations within each bounding box are then extracted for to determine, for example, the location of a user's eyes or mouth 1210. Accordingly, the feature locations are tracked between the first image and the second image using a feature tracking algorithm 1212. For example, a change in location of the user's eyes between subsequent images is calculated and the amount of this change is used to determine an output for the current location of the user's eye that is smoother and reduces jitteriness relative to simply providing the current location of the user's eyes. In one example, if this change is less than a first amount or threshold, then the position of the user has only slightly changed relative to their position in the previous frame. Since this change is small, the current position of the user's eyes can be reasonable estimated as their location in the previous frame, as if the user hasn't moved. In another example, if this change is between the first threshold and a second threshold, a single point tracking algorithm can be used to track the user's eyes between these two frames in order to reduce jitteriness. If, however, this change in optical flow is greater than the second threshold, the current position of the user's eyes can be used. In this instance, the tracking output will appear quite jittery, however, since the change in eye position is so great (i.e., greater than the second threshold) the user has moved quickly or abruptly and, thus, an abrupt change, in this instance, would not only be acceptable, it would likely be expected. Once the current location of the eyes, in this example, is determined for each image captured by each camera, stereo disparity between the two current locations of the eyes in each image is determined. The stereo disparity is then used to determine a z-depth for the eyes, by calculating a distance between the eyes and the computing device, in order to determine a three-dimensional position (x, y, z) of the eyes relative to the computing device.

Figure 13:
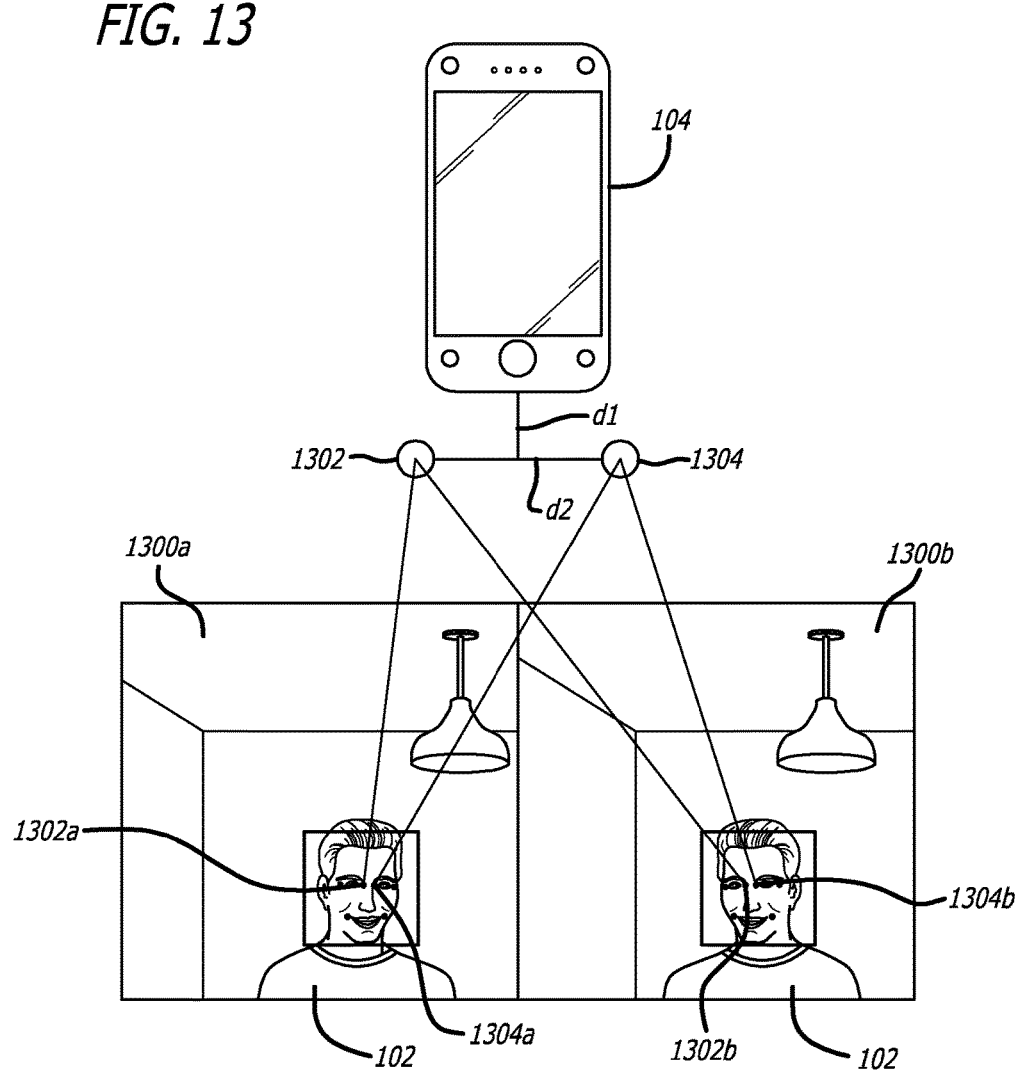
FIG. 13 illustrates an example wherein the three-dimensional information of a user is determined to reject false-positive results in accordance with at least one embodiment.

FIG. 13 illustrates an example wherein the three-dimensional information of a user is determined to reject false-positive results in accordance with at least one embodiment. In this example, computing device 104 includes two cameras; a left camera and a right camera located a fixed distance on the face of computing device 104. Since calibration information and the distance between them is known, three-dimensional information of an object captured by both cameras can be determined via stereo association. Thus, by calculating the disparity of one or more object between images captured by the two cameras, the distance to an object can be determined. Therefore, faces or users that are not within an expected distance range from computing device 104 can be rejected as false-positive results at least as not being the primary user. Additionally, since various human face geometries fall within certain ranges, the distance, length, or size of various features can be used to filter out non-faces, such as the picture frame in FIG. 8.

Figure 14:
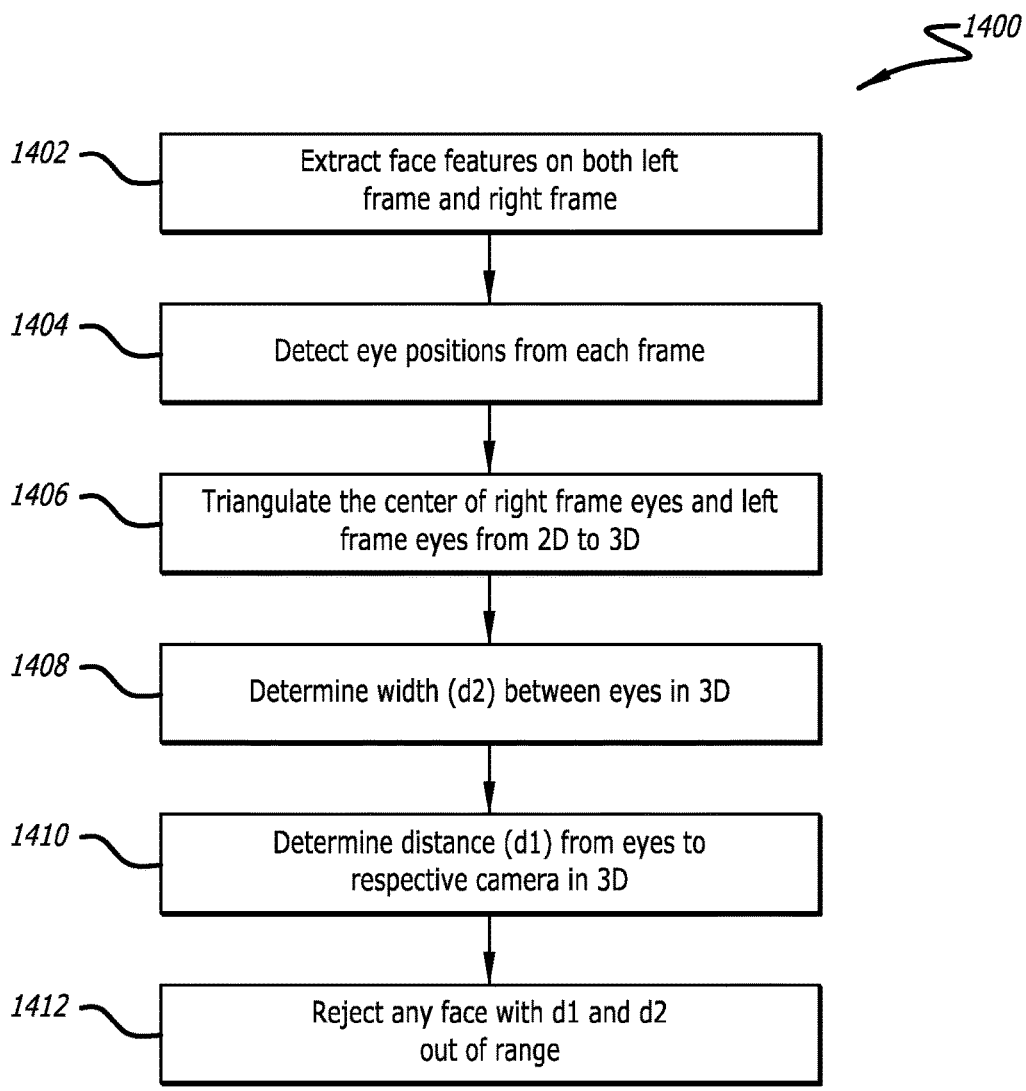
FIG. 14 illustrates an example process for rejecting false-positive results in accordance with various embodiments.

Accordingly, in this example, user 102 has been captured in left image 1300a and right image 1300b. In order to determine whether user 102 is in fact a person, the distance d2 between right eye 1302 and left eye 1304 of user 102 can be determined. This process will be further described with respect to FIG. 14 which illustrates an example process 1300 for rejecting false-positive results in accordance with various embodiments. In this example, face features are extracted from both left image 1300a and right image 1300b 1402. From the extracted face features, eye positions from each image are detected 1304. In this example, the center of left frame eyes 1302a and 1304a and the right frame eyes 1302b and 1304b are triangulated from two-dimensional (2D) to determine their 3D position 1406. Accordingly, with the 3D position information, the width d2 between eyes 1302 and 1304 is determined in 3D 1408 and the distance d1 from eyes 1302 and 1304 to a respective camera is also determined 1410. Accordingly, any potential face that has a d1 (i.e., too far away or too close to the computing device) or has a d2 (i.e., eyes father apart or too close together) outside respective allowable ranges to correspond to a primary user or a face, respectively, is rejected 1412. Accordingly, a face is kept as at least a potential user if:

$a_1 < d_1 < b_1$ and $a_2 < d_2 < b_2$,

Where a is a lower range bound and b is an upper range bound.

Figure 15:
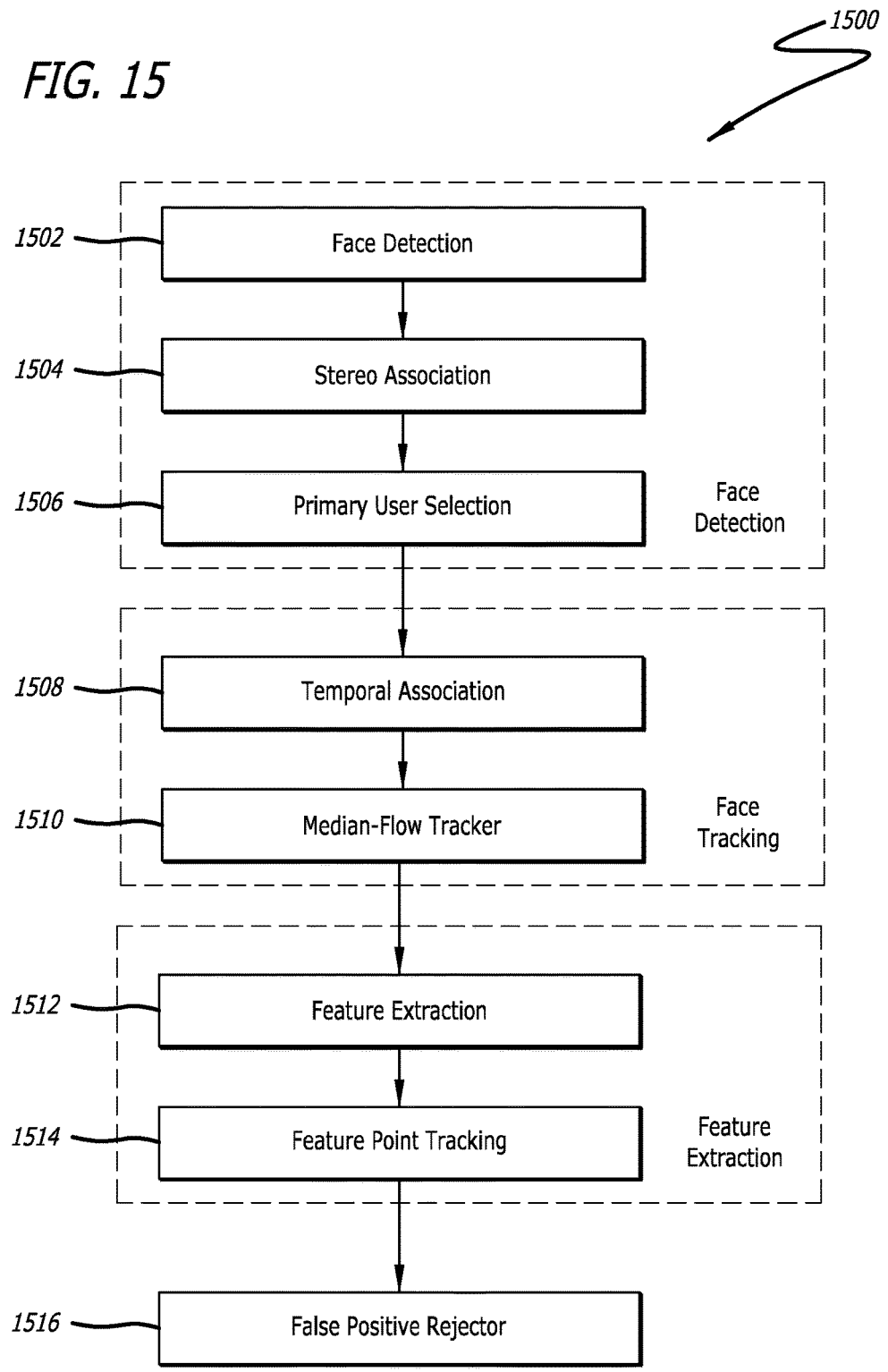
FIG. 15 illustrates an example tracking process in accordance with various embodiments.

FIG. 15 illustrates example tracking process 1500 in accordance with various embodiments. In this example, all process discussed above are discussed together. Accordingly, in this example, a process for tracking the head position of a user begins by detecting a face 1502. For example, a face detection algorithm can be run on each image captured by a respective camera independently. Upon detecting a face, stereo association can be performed to match faces between all cameras 1504. If the faces are matched a face pair is created and used as the first data point in memory for initializing object tracking. If, however, a face was only detected in only one of the cameras, a matching algorithm can analyze the frame missing the face using a template of the face from the other frame in an attempt to recover the missing face in this step. Accordingly, if more than one face is detected in the images, a primary face or user to track can be determined 1506. Accordingly, once the face pair is identified, object tracking can begin and the face pair is stored in memory.

Once a face pair is identified, a subsequent frame from each of the cameras can be analyzed to detect the primary user's face from image frame to frame (e.g., tracking-by-detection) in a temporal association step 1508. Accordingly, a Median Flow Tracker can be used when the face pair is not detected in at least one of the current image frames 1510. Then, in a subsequent frame, the process of attempting to detect the face pair can resume. Therefore, if the face pair is detected in a previous frame, tracking-by-detection is performed. If the face pair is not detected in the previous frame, the second tracking algorithm is used.

Further, features of a user's face can be extracted for each captured frame to determine the location of a user's eyes and mouth, for example 1512. The change in position of these features between subsequent image frames can be used to determine what tracking method will be used for that particular frame. For example, the change in optical flow of a user's eyes can be calculated for a current and previous image frame pair. In one example, if this change is less than a first amount or threshold, then the position of the user's eyes has only slightly changed relative to their position in the previous frame. Since this change is small, the user's current eye position can be reasonable estimated as its location in the previous frame, as if the user hasn't moved. In another example, if this change is between the first threshold and a second threshold, a single point tracking algorithm can be used to track the user's eyes between these two frames in order to reduce jitteriness. If, however, this change in optical flow is greater than the second threshold, the current position of the user's eyes can be used. In this instance, the tracking output will appear quite jittery, however, since the change in eye position is so great (i.e., greater than the second threshold) the user has moved quickly or abruptly and, thus, an abrupt change, in this instance, would not only be acceptable, it would likely be expected. Once the current location of the eyes, in this example, is determined for each image captured by each camera, stereo disparity between the eyes in each of these images is determined. The stereo disparity is then used to determine a z-depth for the eyes, by calculating a distance between the eyes and the computing device, in order to determine a three-dimensional position (x, y, z) of the eyes relative to the computing device. Accordingly, a point relative to one or more features of the user's face can be tracked in three-dimensions (x, y, z) in order to provide a smoother and more accurate location of the user relative to a computing device. Additionally, once these features have been identified, various heuristics can be applied to reject false positive user detections 1516.

Figure 16:
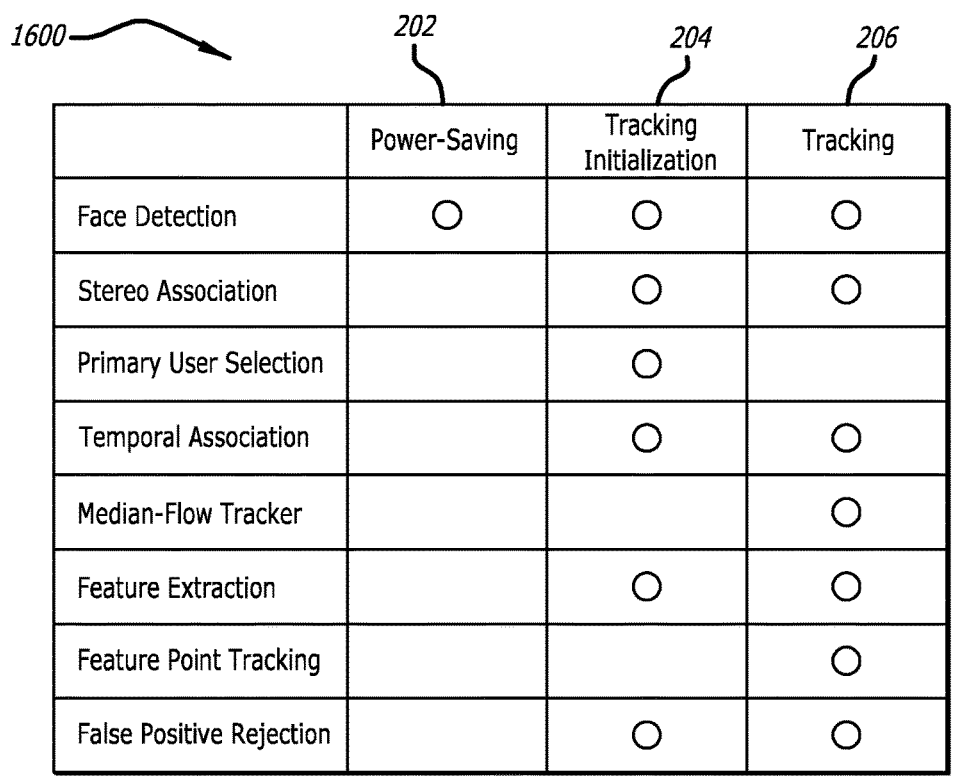
FIG. 16 illustrates an example table wherein various detection and tracking features are associated with various modes in accordance with at least one embodiment.

FIG. 16 illustrates an example table 1600 wherein various detection and tracking features are associated with various modes in accordance with at least one embodiment. Accordingly, as discussed above, face detection is performed at low resolutions and periodically in a power-saving mode. Upon detecting an object that may be a user, a computing device will enter a tracking initialization mode. In the tracking initialization mode, a more aggressive form of face detection relative to the power saving mode is performed, along with stereo association, primary user selection, temporal association, feature extraction, and false positive rejection. Thus, upon detecting the user, rejecting false positives, and identifying a primary user, a tracking mode is initiated. Accordingly, in the tracking mode, face detection, stereo association, temporal association, feature extraction, and false positive rejection are also performed. Additionally, in the tracking mode, primary user selection is not performed, since the primary user only needs to be determined once, and selectively the median flow tracker and feature point tracking can be performed.

Figures 17A, 17B:
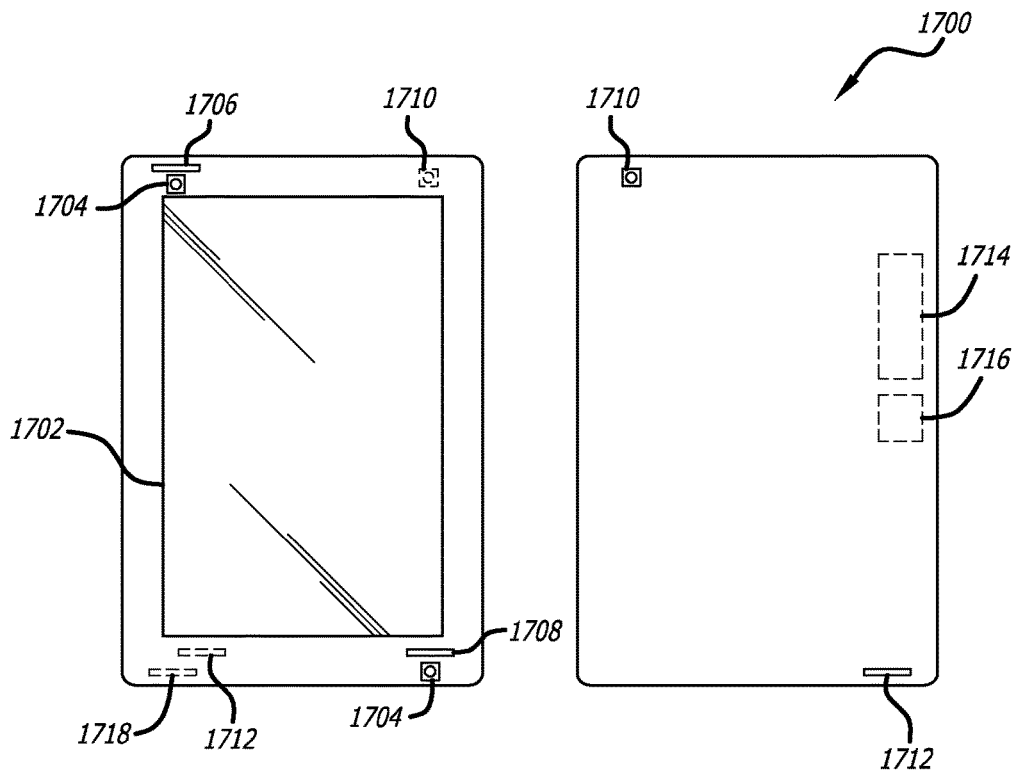
FIGS. 17A and 17B illustrate an example computing device that can be used to implement aspects of various embodiments.

FIGS. 17A and 17B illustrate front and back views, respectively, of an example electronic computing device 1700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1700 has a display screen 1702 (e.g., an LCD element) operable to display information or image content to one or more users or viewers of the device. The display screen of some embodiments displays information to the viewer's facing the display screen (e.g., on the same side of the computing device as the display screen). The computing device in this example can include one or more imaging elements, in this example including two image capture elements 1704 on the front of the device and at least one image capture element 1710 on the back of the device. It should be understood, however, that image capture elements could also, or alternatively, be placed on the sides or corners of the device, and that there can be any appropriate number of capture elements of similar or different types. Each image capture element 1704 and 1710 may be, for example, a camera, a charge-coupled element (CCD), a motion detection sensor or an infrared sensor, or other image capturing technology.

As discussed, the device can use the images (e.g., still or video) captured from the imaging elements 1704 and 1710 to generate a three-dimensional simulation of the surrounding environment (e.g., a virtual reality of the surrounding environment for display on the display element of the device). Further, the device can utilize outputs from at least one of the image capture elements 1704 and 1710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1708 on the front side, one microphone 1712 on the back, and one microphone 1706 on or near a top or side of the device. In some devices there may be only one microphone, while in other devices there might be at least one microphone on each side and/or corner of the device, or in other appropriate locations.

The device 1700 in this example also includes one or more orientation- or position-determining elements 1718 operable to provide information such as a position, direction, motion, or orientation of the device. These elements can include, for example, accelerometers, inertial sensors, electronic gyroscopes, and electronic compasses.

The example device also includes at least one communication mechanism 1714, such as may include at least one wired or wireless component operable to communicate with one or more electronic or computing devices. The device also includes a power system 1716, such as may include a battery operable to be recharged through conventional plug-in approaches, or through other approaches such as capacitive charging through proximity with a power mat or other such element. Various other elements and/or combinations are possible as well within the scope of various embodiments.

Figure 18:
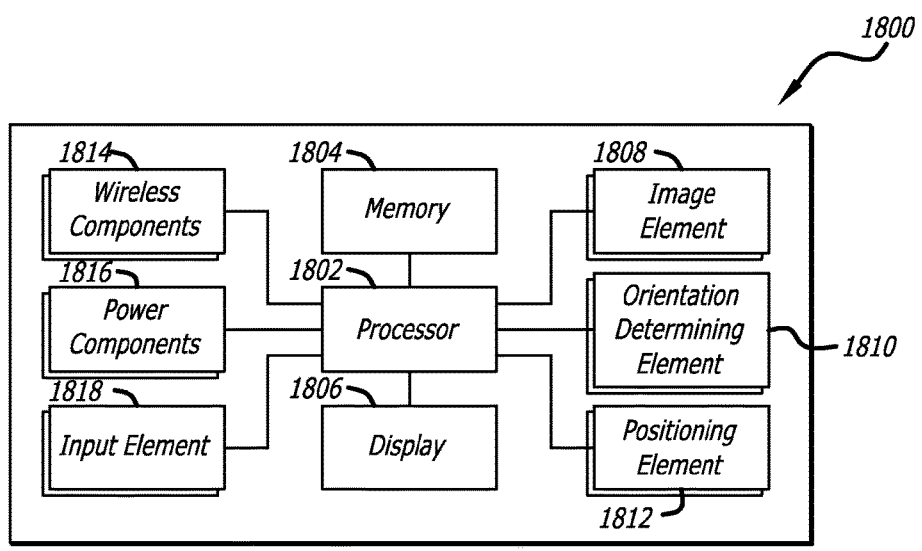
FIG. 18 illustrates example components that can be used with a device such as that illustrated in FIGS. 17A and 17B.

FIG. 18 illustrates a set of basic components of an electronic computing device 1800 such as the device 1700 described with respect to FIGS. 17A and 17B. In this example, the device includes at least one processing unit 1802 for executing instructions that can be stored in a memory element or element 1804. As would be apparent to one of ordinary skill in the art, the device can include many types of memory, data storage, or computer-readable media, such as a first data storage for program instructions for execution by the processing unit(s) 1802, the same or separate storage can be used for images or data, a removable memory can be available for sharing information with other devices, and any number of communication approaches can be available for sharing with other devices.

The device typically will include some type of display element 1806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1800 also includes at least one orientation determining element 1810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1814 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1816, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 1818 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 19:
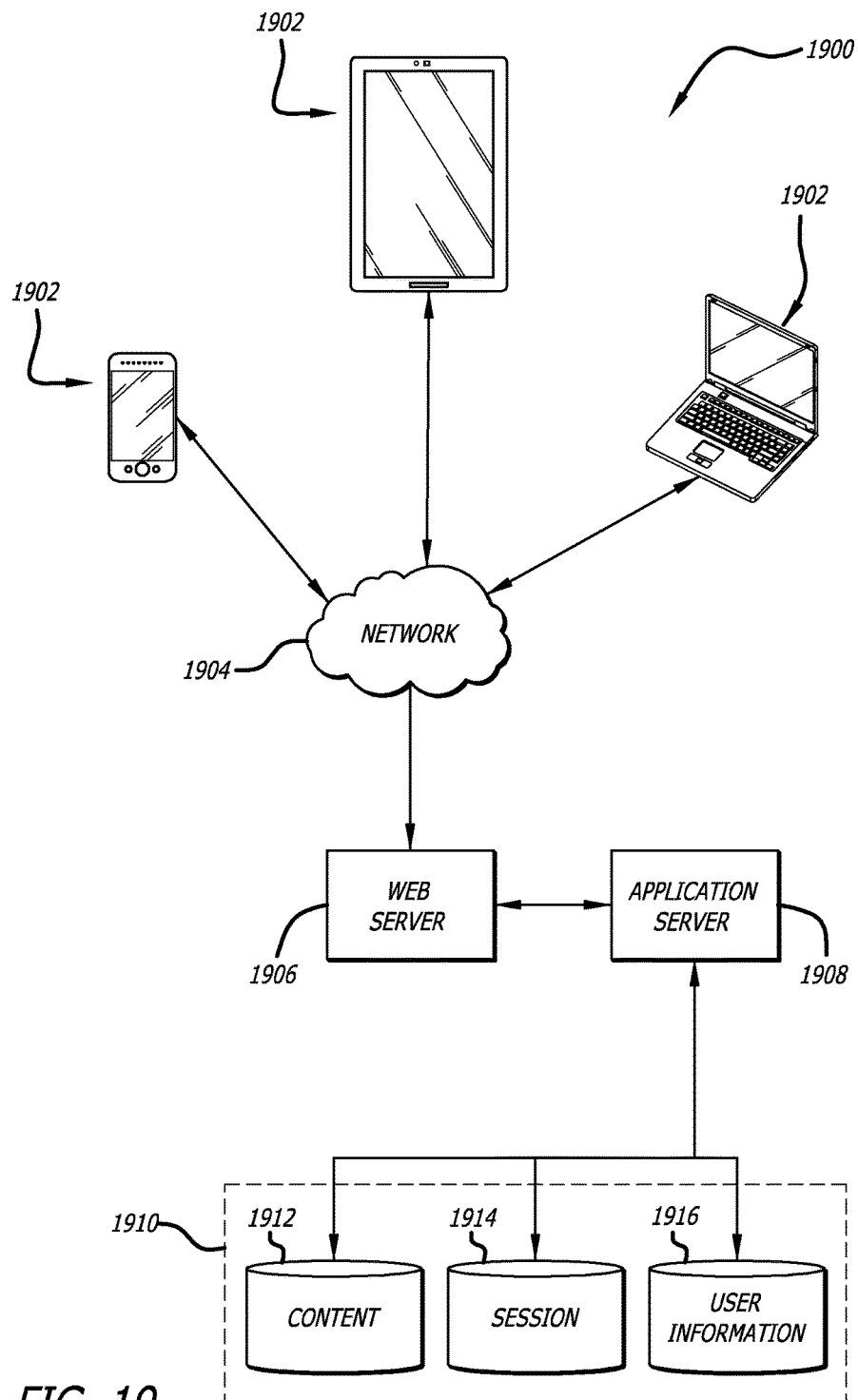
FIG. 19 illustrates an environment in which various embodiments can be implemented.

As discussed, different approaches can be implemented in various environments in accordance with the described embodiments. For example, FIG. 19 illustrates an example of an environment 1900 for implementing aspects in accordance with various embodiments. As will be appreciated, although a Web-based environment is used for purposes of explanation, different environments may be used, as appropriate, to implement various embodiments. The system includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1906 for receiving requests and serving content in response thereto, although for other networks, an alternative device serving a similar purpose could be used, as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1908 can include any appropriate hardware and software for integrating with the data store 1910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1906 in the form of HTML, XML or another appropriate structured language in this example. The handling of all requests and responses, as well as the delivery of content between the client device 1902 and the application server 1908, can be handled by the Web server 1906. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing content (e.g., production data) 1912 and user information 1916, which can be used to serve content for the production side. The data store is also shown to include a mechanism for storing log or session data 1914. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
at least one processor;
a right camera having a first field of view;
a left camera having a second field of view at least partially overlapping the first field of view; memory including instructions that, when executed by the at least one processor, cause the computing device to:
capture right image data with the right camera;
capture left image data with the left camera;
detect, using a face detection algorithm, a first right representation of a first face and a second right representation of a second face in the right image data, the face detection algorithm returning a first right bounding box for the first right representation and a second right bounding box for the second right representation;
detect, using the face detection algorithm, a first left representation of the first face and a second left representation of the second face in the left image data, the face detection algorithm returning a first left bounding box for the first face and a second left bounding box for the second face, wherein the first right representation and the first left representation form a first set of representations for the first face and the second left representation and the second right representation form a second set of representations for the second face;
determine that the first set of representations satisfy a first selection criterion, the first selection criterion corresponds to a larger stereo disparity;
determine that the first set of representations satisfy a second selection criterion, the second selection criterion corresponds to a larger average bounding box size;
determine that the first set of representations satisfy a third selection criterion, the third selection criterion corresponds to a shorter average distance to center of a camera field of view; and
select the first face as a primary face for a face tracking algorithm to track in subsequent images based on at least one of the first set of representations satisfying two or more of the first selection criterion, the second selection criterion, or the third selection criterion.

2. The computing device of claim 1, wherein the instructions when executed further cause the computing device to:
determine, based at least in part on the first stereo disparity, a first length between a first right eye and a first left eye of the first face;
determine the first length is greater or less than an acceptable range of eye lengths; and
determine the first face is not a user based on the first length being greater or less than the acceptable range of eye lengths.

3. The computing device of claim 1, wherein the instructions when executed further cause the computing device to:
determine a first stereo disparity associated with the first face by calculating a difference between a first position of a first center of the first right bounding box and a second position of a second center of the first left bounding box.

4. A computer-implemented method, comprising:
acquiring image data captured by one or more cameras;
detecting one or more first bounding boxes associated with a first object represented in the image data;
detecting one or more second bounding boxes associated with a second object represented in the image data;
determining a first size associated with the one or more first bounding boxes;
assigning a first value associated with the first size to the first object;
determining a second size associated with the one or more second bounding boxes;
determining a first distance associated with the one or more cameras and the one or more first bounding boxes;
assigning a second value associated with the first distance to the first object;
determining a second distance associated with the one or more cameras and the one or more second bounding boxes;
determining a third distance associated with a reference point in the image data and the one or more first bounding boxes;
assigning a third value associated with the third distance to the first object;
determining a first combination value associated with the first object based at least in part by applying the first value the second value and the third value;
determining a second combination value associated with the second object; and
selecting the first object as a primary object based at least in part on the first combination value and the second combination value.

5. The computer-implemented method of claim 4, further comprising:
detecting a first bounding box associated with the first object represented in a first image of the image data;
detecting a second bounding box associated with the first object represented in a second image of the image data; and
determining the first distance as a displacement between the first bounding box and the second bounding box.

6. The computer-implemented method of claim 4, further comprising:
determining a first stereo disparity between a first representation of the first object in a first image of the image data and a second representation of the first object in a second image of the image data; and
determining a second stereo disparity between a third representation of the second object in the first image and a fourth representation of the second object in the second image,
wherein the first object is a first face and the second object is a second face.

7. The computer-implemented method of claim 6, further comprising:
determining, based at least in part on the first stereo disparity, a first length between a first right eye and a first left eye of the first face;
determining, based at least in part on the second stereo disparity, a second length between a second right eye and a second left eye of the second face;

determining at least one of the first length or the second length is greater or less than an acceptable range of eye lengths; and determining at least one of the first face or the second face is not a user based on at least one of the first length or the second length being greater or less than the acceptable range of eye lengths.

8. The computer-implemented method of claim 6, further comprising:

determining, based at least in part upon the first stereo disparity, a fifth distance between the first face and a display screen; and determining, based at least in part upon the second stereo disparity, a sixth distance between the second face and the display screen, wherein selecting the primary object is further based at least in part on a shortest distance between the fifth distance and the sixth distance.

9. The computer-implemented method of claim 8, further comprising:

detecting the one or more first bounding boxes from first pixels associated with the first face in the image data; and determining the one or more second bounding boxes from second pixels associated with the second face in the image data.

10. The computer-implemented method of claim 9, further comprising:

determining first features for the first face using a feature extraction algorithm; and determining second features for the second face using the feature extraction algorithm.

11. The computer-implemented method of claim 4, further comprising:

detecting a first face represented in a first image of the image data as a first representation of the first object;

detecting the first face represented in a second image of the image data as a second representation of the first object;

determining that the first representation matches the second representation;

associating the first representation with the second representation;

detecting a second face represented in the first image as a third representation of the second object;

detecting the second face represented in the second image as a fourth representation of the second object;

determining that the third representation matches the fourth representation; and associating the third representation with the fourth representation.

12. The computer-implemented method of claim 5, further comprising:

capturing the first image using a first camera of the one or more cameras having a first field of view; and capturing a second image of the image data using a second camera of the one or more cameras having a second field of view that at least partially overlapping the first field of view.

13. A computing device, comprising:

at least one processor;

memory including instructions that, when executed by the at least one processor, cause the computing device to:

acquire image data captured by one or more cameras;

detect one or more first bounding boxes associated with a first face represented in the image data;

detect one or more second bounding boxes associated with a second face in the image data;

determine a first size associated with the one or more first bounding boxes;

assign a first value associated with the first size to the first face;

determine a second size associated with the one or more second bounding boxes;

determine a first distance associated with the one or more cameras and the one or more first bounding boxes;

assign a second value associated with the first distance to the first face;

determine a second distance associated with the one or more cameras and the one or more second bounding boxes;

determine a third distance associated with a reference point in the image data and the one or more first bounding boxes;

assign a third value associated with the third distance to the first face;

determine a first combination value associated with the first face based at least in part by applying the first value, the second value, and the third value;

determine a second combination value associated with the second face; and select the first face as a primary face based at least in part on determining the first combination value exceeds the second combination value.

14. The computing device of claim 13, wherein the instructions when executed further cause the computing device to:

detect a first bounding box associated with the first face represented in a first image of the image data;

detect a second bounding box associated with the first face represented in a second image of the image data; and determine the first distance as a displacement between the first bounding box and the second bounding box.

15. The computing device of claim 13, wherein the instructions when executed further cause the computing device to:

determine a fourth distance associated with the reference point and the one or more second bounding boxes assign a fourth value associated with the second size to the second face;

assign a fifth value associated with the second distance to the second face;

assign a sixth value associated with the fourth distance to the second face; and determine the second combination value associated with the second face based at least in part by applying the fourth value, the fifth value, and the sixth value.

16. The computing device of claim 13, wherein the instructions when executed further cause the computing device to:

determine a first stereo disparity between a first bounding box associated with the first face represented in a first image of the image data and a second bounding box associated with the first face in a second image of the image data; and determine a second stereo disparity between a third bounding box associated with the second face represented in the first image and a fourth bounding box associated with the second face represented in the second image.

17. The computing device of claim 16, wherein the instructions when executed further cause the computing device to:
- determine, based at least in part on the first stereo disparity, a first length between a first right eye and a first left eye of the first face;
- determine, based at least in part on the second disparity, a second length between a second right eye and a second left eye of the second face;
- determine at least one of the first length or the second length is greater or less than an acceptable range of eye lengths; and
- determine at least one of the first face or the second face is not a user based on at least one of the first length or the second length being greater or less than the acceptable range of eye lengths.

18. The computing device of claim 17, wherein the instructions when executed further cause the computing device to:
- detect the one or more first bounding boxes from first pixels associated with the first face in the image data; and
- determining the one or more second bounding boxes associated with the second face in the image data.

* * * * *